United States Patent [19]

Wilfinger et al.

[11] Patent Number: 4,838,126
[45] Date of Patent: Jun. 13, 1989

[54] ELECTRO/HYDRAULIC CONTROL SYSTEM FOR AN AUTOMATIC TRANSMISSION

[75] Inventors: Erich L. Wilfinger, Livonia; Ronald J. Polomski, Pinckney, both of Mich.; Darren L. Firth, Baulkham Hills, Australia

[73] Assignee: BTR Engineering (Australia) Limited, Melbourne, Australia

[21] Appl. No.: 125,121

[22] Filed: Nov. 25, 1987

[51] Int. Cl.[4] .......................................... B60K 41/10
[52] U.S. Cl. ...................................... 74/869; 74/866; 364/424.1
[58] Field of Search ............... 74/869, 866; 364/424.1

[56] References Cited

U.S. PATENT DOCUMENTS

| | | | |
|---|---|---|---|
| 3,813,964 | 6/1974 | Ichimura et al. | 74/869 X |
| 3,937,105 | 2/1976 | Arai et al. | 74/846 |
| 3,943,799 | 3/1976 | Sakai et al. | 74/866 |
| 4,208,929 | 6/1980 | Heino et al. | 74/731 |
| 4,262,335 | 4/1981 | Ahlen et al. | 364/431 |
| 4,308,764 | 1/1982 | Kawamoto et al. | 74/866 X |
| 4,345,489 | 8/1982 | Müller et al. | 74/866 X |
| 4,351,206 | 9/1982 | Lemieux et al. | 74/866 |
| 4,523,281 | 6/1985 | Noda et al. | 192/0.033 X |
| 4,551,802 | 11/1985 | Smyth | 364/424.1 |
| 4,558,612 | 12/1985 | Shimizu et al. | 74/844 |
| 4,563,918 | 1/1986 | Sugano | 74/869 |
| 4,579,020 | 4/1986 | Sugano | 74/869 |
| 4,607,542 | 8/1986 | Sugano | 74/869 |
| 4,616,531 | 10/1986 | Ogasawara et al. | 74/866 |
| 4,616,532 | 10/1986 | Sakai et al. | 74/869 |
| 4,617,841 | 10/1986 | Sugano | 74/869 |
| 4,622,866 | 11/1986 | Ito et al. | 74/866 |
| 4,628,771 | 12/1986 | Person et al. | 74/856 |
| 4,628,772 | 12/1986 | Nishikawa et al. | 74/869 X |
| 4,637,281 | 1/1987 | Van Selous | 74/869 |
| 4,660,441 | 4/1987 | Young | 74/867 |
| 4,665,770 | 11/1987 | Van Selous | 74/733 |
| 4,665,774 | 5/1987 | Oguri | 74/868 |
| 4,665,776 | 5/1987 | Sugano | 74/867 |
| 4,667,540 | 5/1987 | Yagi | 74/866 |
| 4,679,466 | 7/1987 | Kumara et al. | 74/863 |
| 4,679,988 | 7/1987 | Leorat et al. | 417/218 |
| 4,680,989 | 7/1987 | Sykora et al. | 74/867 |
| 4,680,992 | 7/1987 | Hayasaki et al. | 74/869 |
| 4,685,356 | 8/1987 | Iwatsuki | 74/866 |
| 4,690,015 | 9/1987 | Nagano et al. | 74/665 GE |
| 4,691,285 | 9/1987 | Takeda | 364/424.1 |
| 4,691,594 | 9/1987 | Taga et al. | 74/869 |

Primary Examiner—Leslie A. Braun
Assistant Examiner—Douglas Fox
Attorney, Agent, or Firm—Dressler, Goldsmith, Shore, Sutker & Milnamow

[57] ABSTRACT

An electro/hydraulic control system for automatically shifting gear stages of a multiple stage transmission gear mechanism by selectively controlling the operable effectiveness of various hydraulically operated friction units in accordance with vehicle operating conditions. The control system includes a series of hydraulic shift valves arranged in combination with at least two pressure regulator valves for controlling the supply of hydraulic actuating fluid to the friction units in response to ratio selection signals derived in an electronic control. The control system further includes at least one variable pressure solenoid whose variable pressure output is multiplexed to each pressure regulator valve in the system to provide for quality shifts between gear ratios. The desired end is effected by programmably profiling the output of the variable pressure solenoid. The regulator valves allows the profiled output of the variable pressure solenoid to pass to the effected friction unit to effect a smooth transition between gear ratios and then to deliver full actuating fluid pressure to the respective friction unit to complete the shift. To assure performance and commercial reliability, the control system includes a unique redundancy feature or characteristic. That is, the full actuating fluid pressure which is delivered to the respective friction unit is derived by either maximizing the pressure output of the variable pressure solenoid after the shift or gear change is effected or by allowing full actuating fluid pressure to pass through the regulator valve from the shift valve to the respective friction unit. In either manner, the friction unit is assuredly operated and the gear shift is effected.

48 Claims, 12 Drawing Sheets

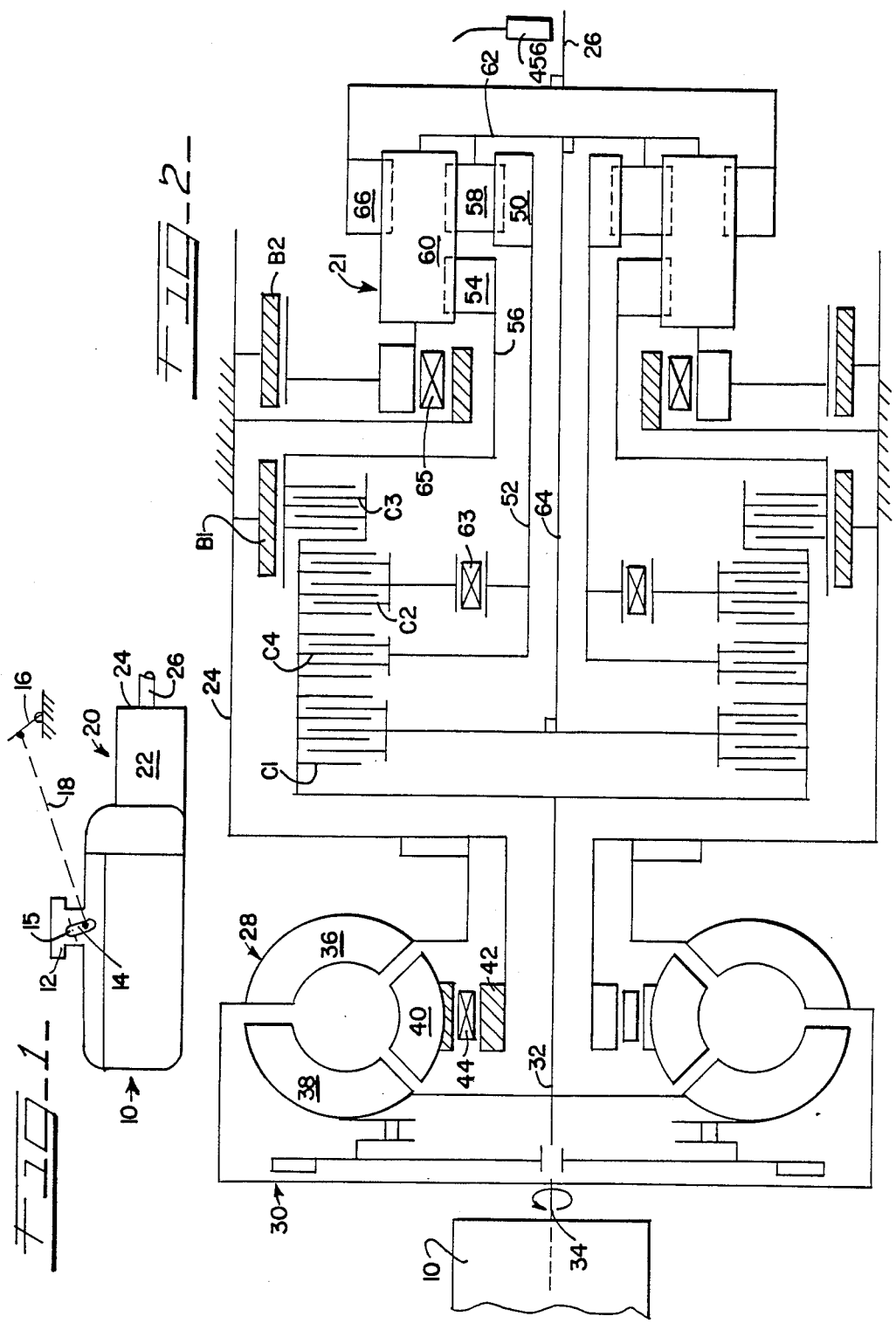

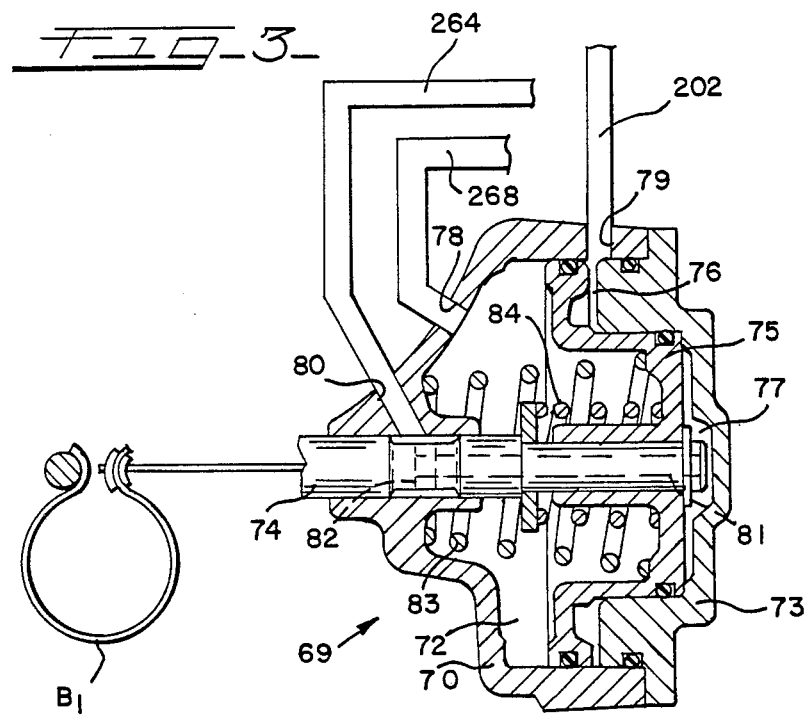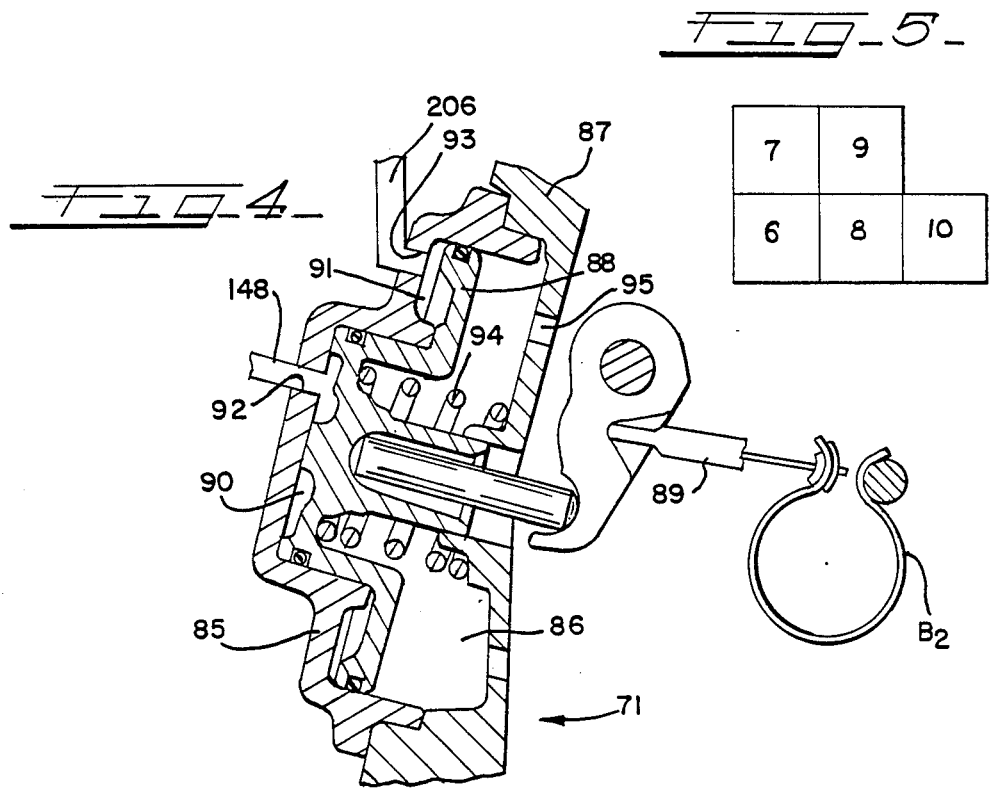

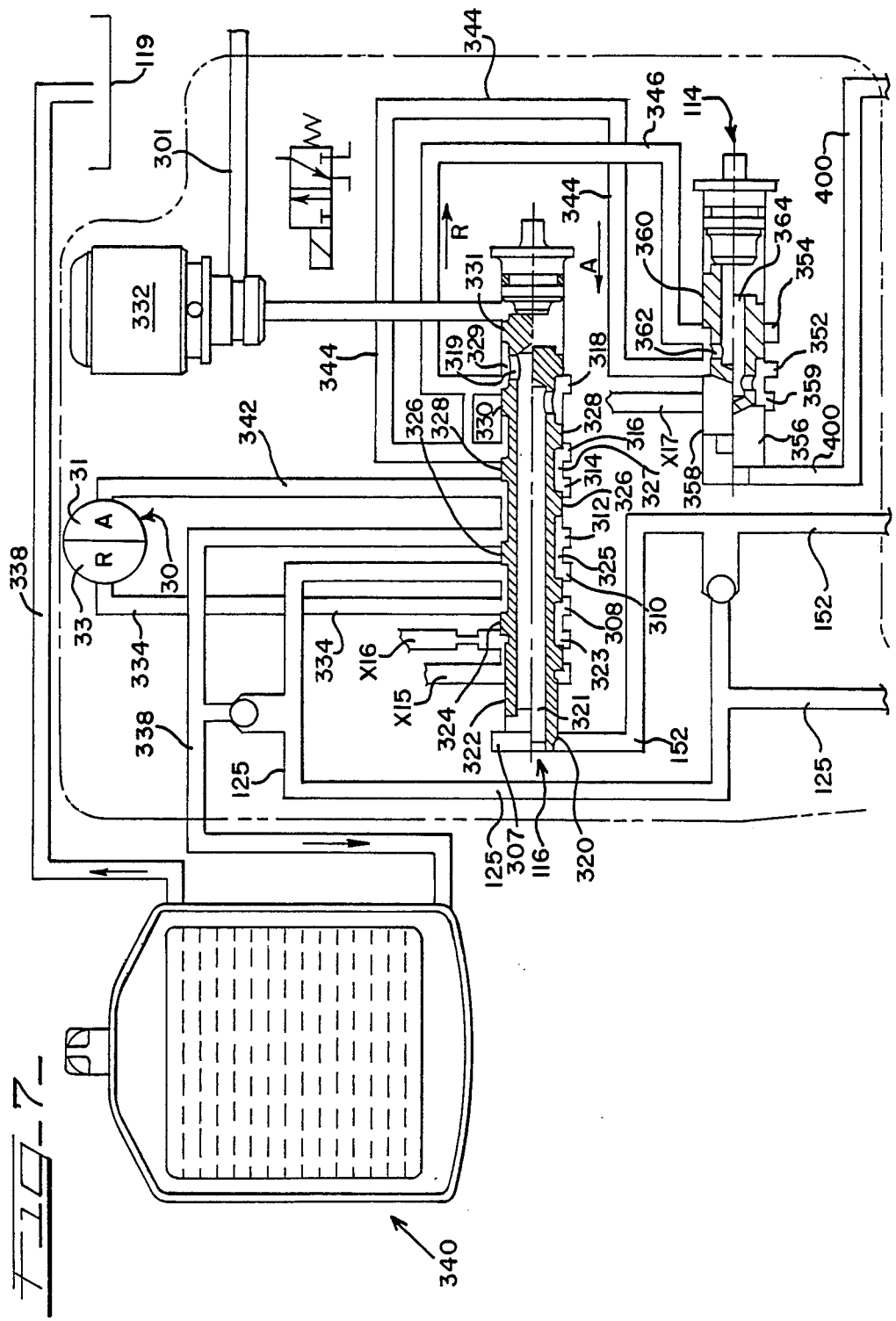

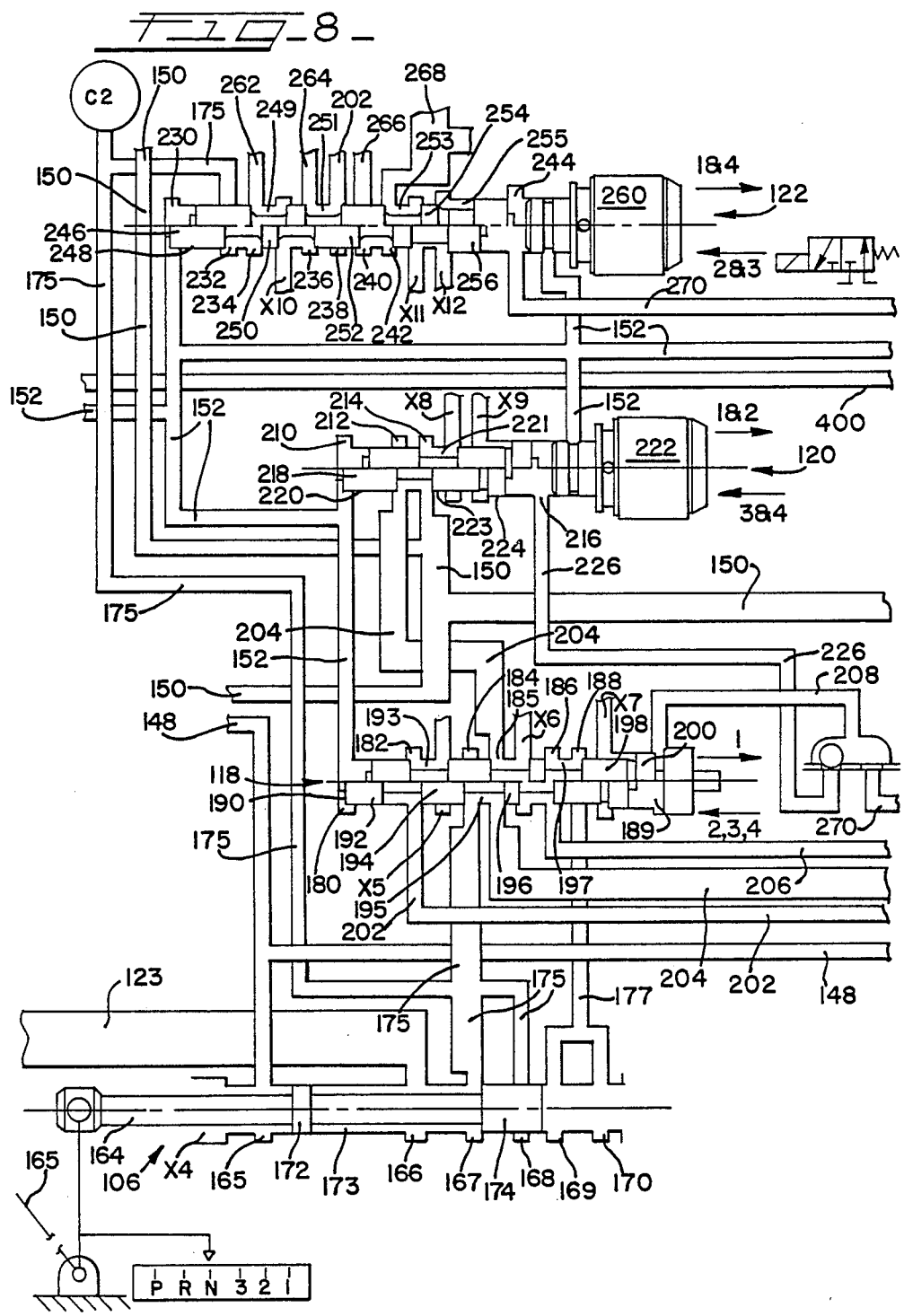

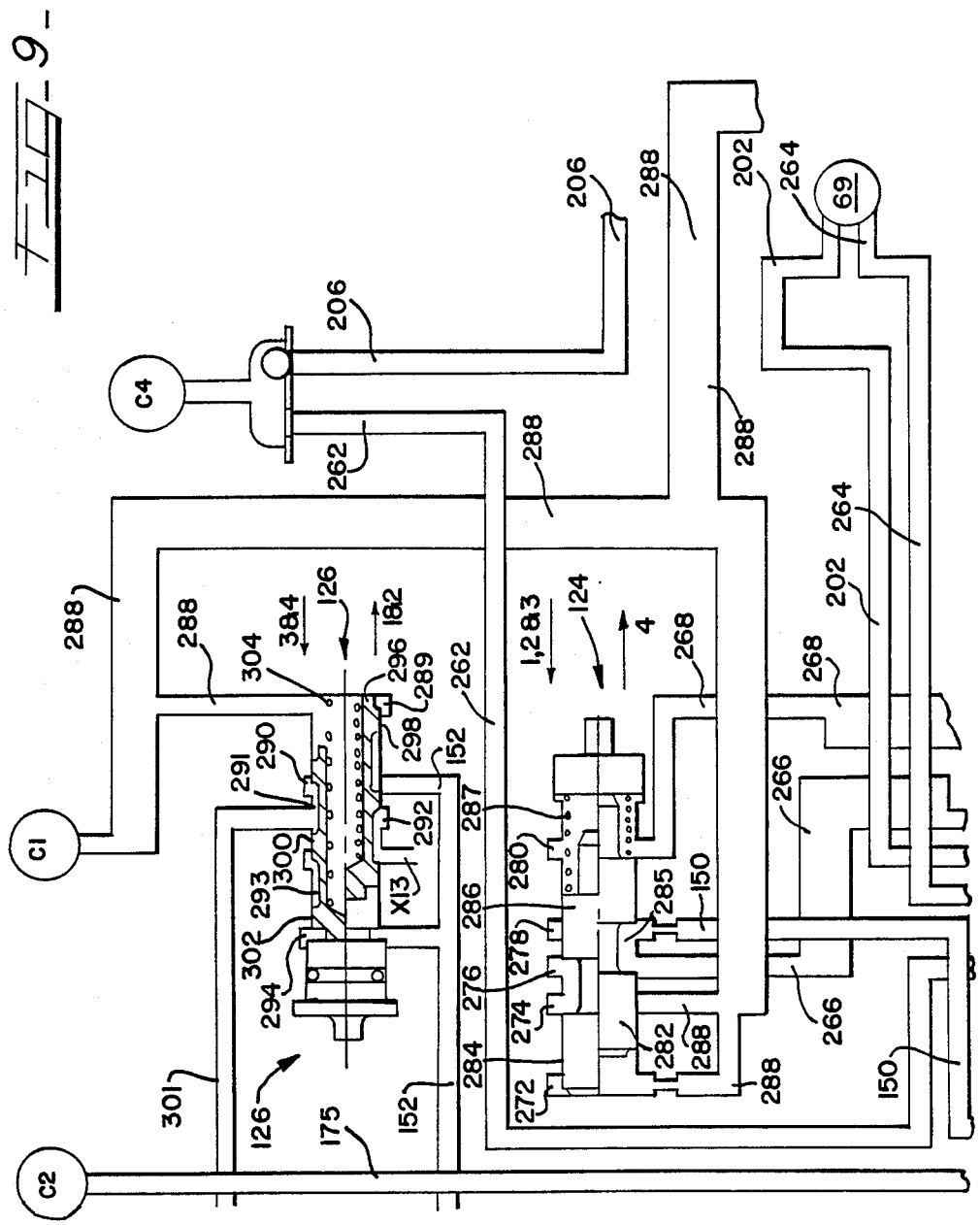

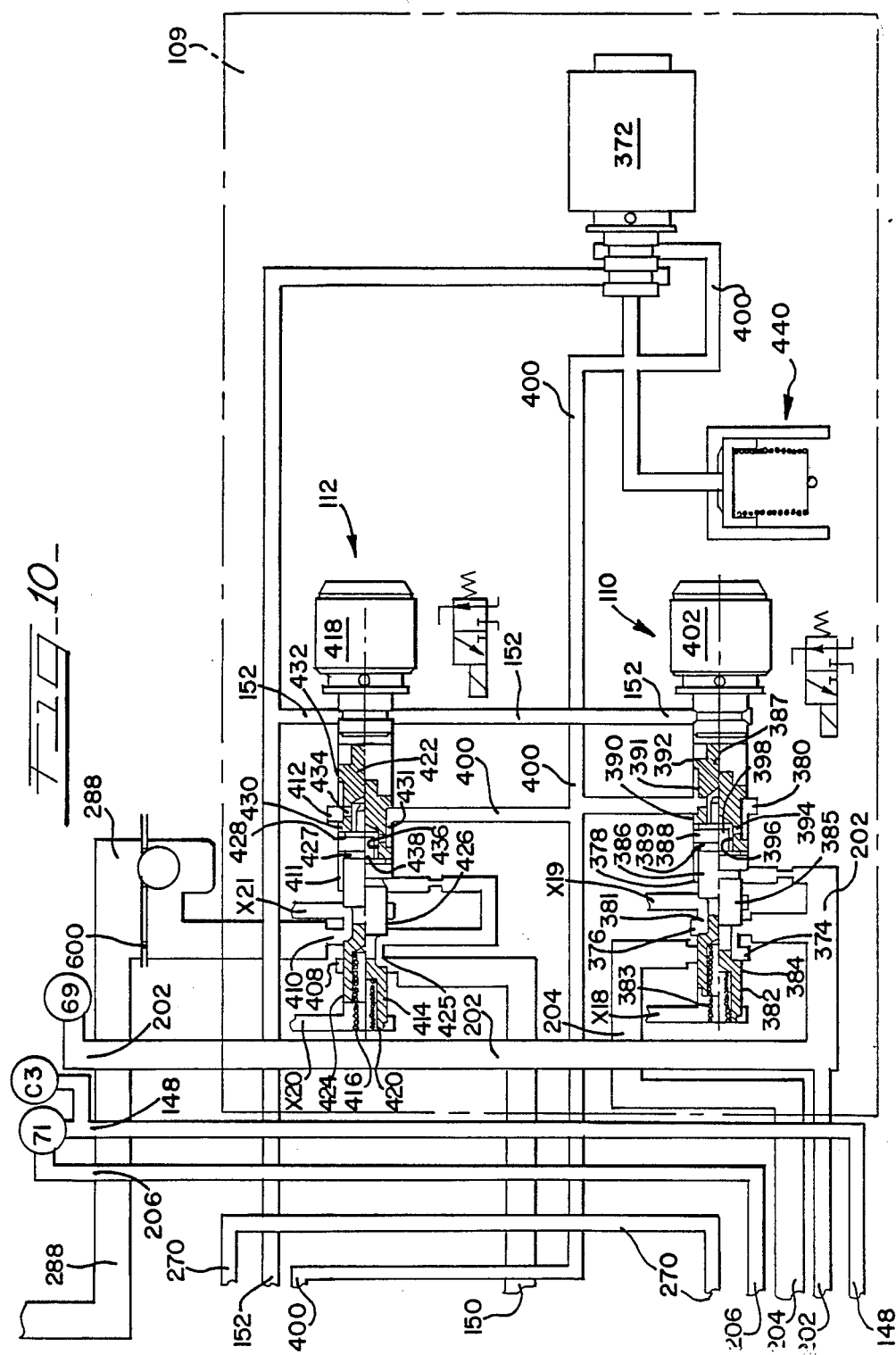

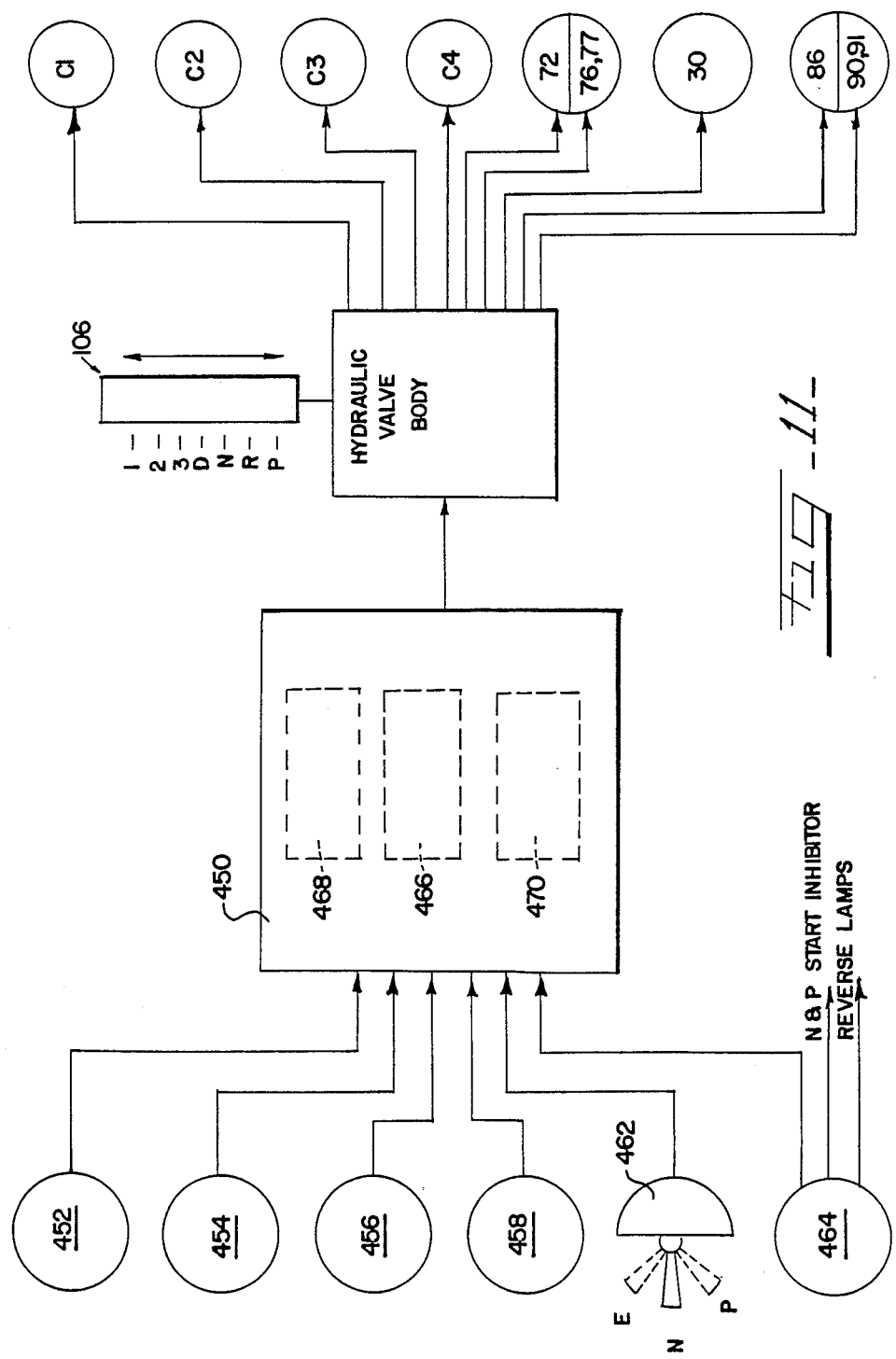

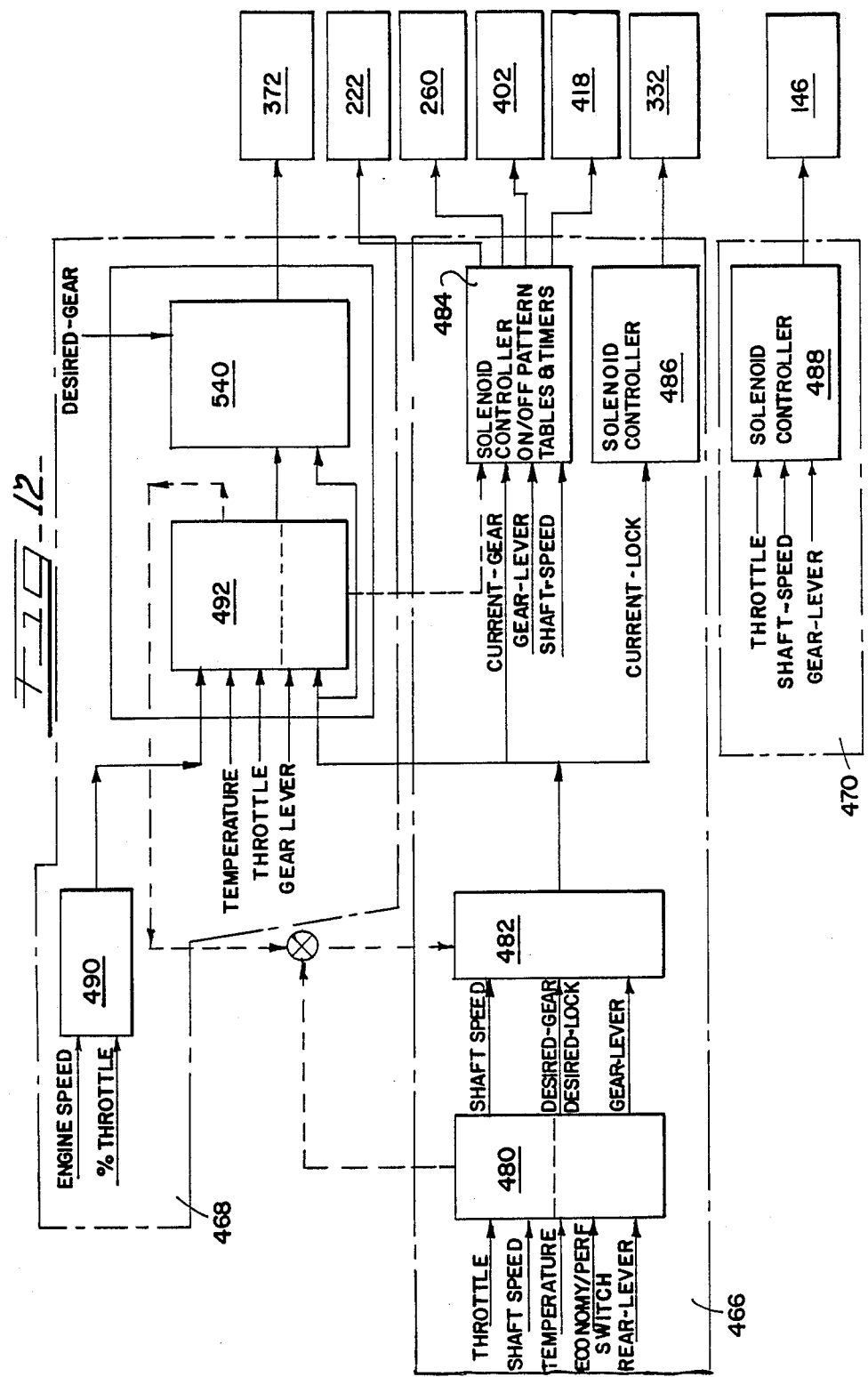

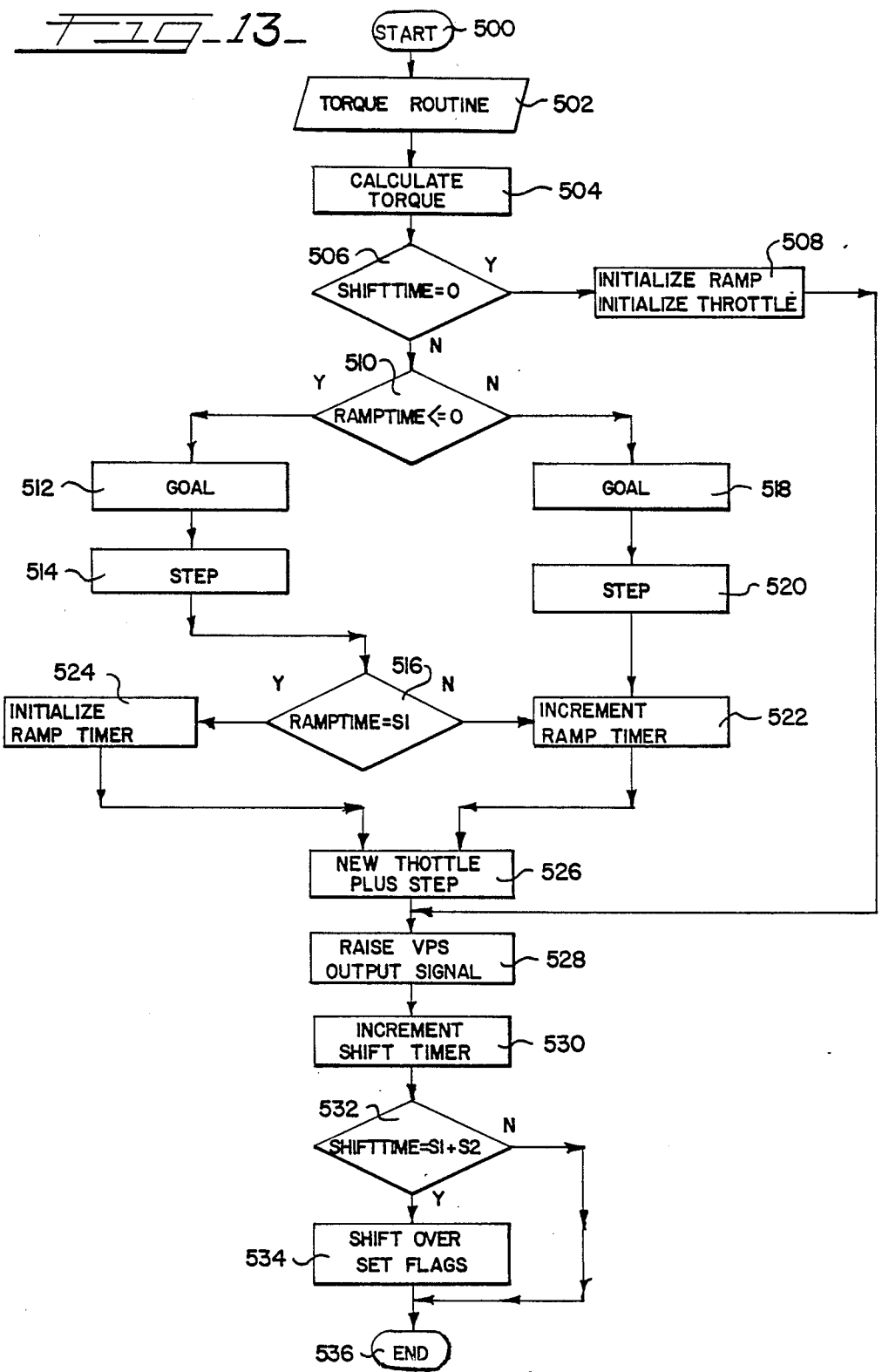

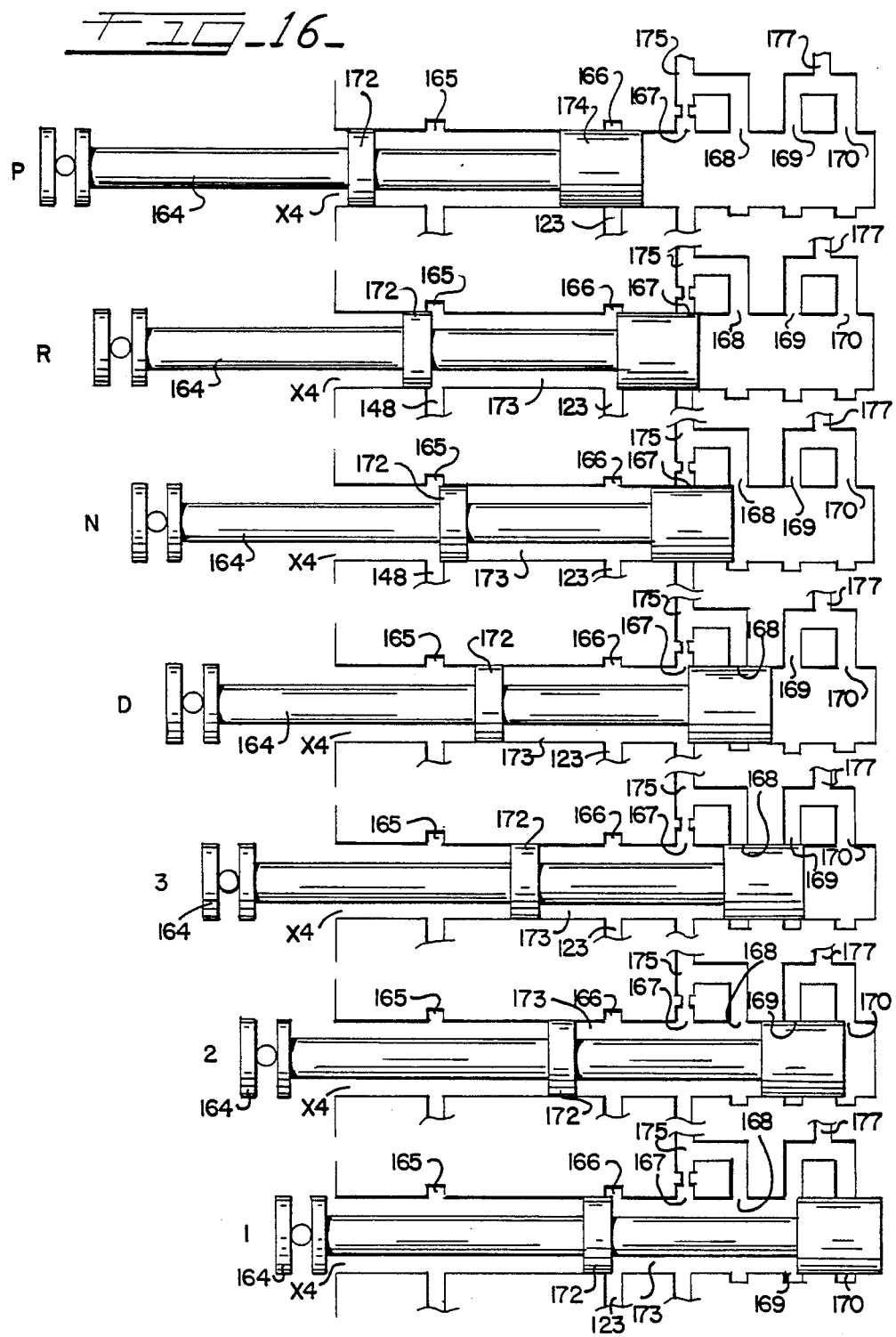

ELECTRO/HYDRAULIC CONTROL SYSTEM FOR AN AUTOMATIC TRANSMISSION

FIELD OF THE INVENTION

The present invention relates to an automatic transmission control system for a vehicle having an engine and, more particularly, to an automatic transmission control system so adapted to enable smooth quality shifts between drive ratios.

BACKGROUND OF THE INVENTION

A typical automatic transmission for a vehicle comprises a gear mechanism which can be conditioned to provide any one of a plurality of forward drive gear ratios between its input shaft, which is connectable to the crankshift of an engine, and its output shaft. Automatic transmissions are commonly equipped with a plurality of friction engaging devices which control the rotary state of various elements of the gear mechanism and, thereby, a desired one of the forward gear drive ratios. Such friction engaging elements typically include hydraulically actuated clutches and brakes.

For selecting a desired one of the forward gear drive ratios, such automatic transmission usually include some form of control system. The control system usually has a plurality of shift valves for selectively connecting and disconnecting various hydraulic circuits to a source of hydraulic pressure in a manner selectively engaging one or more of the friction elements. The forward drive ratios are automatically selected in a determinate manner according to the present values of the vehicle's operating parameters and by one or more conventionally described shift diagrams.

Careful control of the timing and operation for engagement and disengagement of such friction engaging devices is particularly required in order to eliminate shifting shock between gear changes or shifts. If the operation of the friction engaging devices involved in effecting the shift is not carefully coordinated, a troublesome shifting shock can be generated in the power train. Such shocks between shifts reduce the comfort of vehicle operation and the drivability of the vehicle. Moreover, these shocks to the power train can significantly shorten a transmission's effective life, durability, and reliability.

SUMMARY OF THE INVENTION

In line with the above, and in accordance with the invention, there is provided a control system for an overdrive transmission of rear drive configuration. The transmission has a conventional mechanical arrangement driven by a unique microprocessor based control system which utilizes input signals from a plurality of vehicle sensors to control all shift quality and schedule aspects. The control system of the present invention provides improved transmission performance within compact space requirements and the control approach is considerably more flexible than known designs.

More specifically, the preferred form of the transmission includes a gear train whose condition is effected by the relative actuation of a series of fluidically actuatable friction units preferably including four clutch assemblies, two bands or brakes, and two sprags or one way clutches. The transmission may also include a lockup clutch. The clutch assemblies and bands operate in a conventional manner in association with the rotary gear elements of the gear train. A series of six input sensors provide present vehicle operating data to an electronic control unit which controls shift quality and two independent shift schedules. The electronic control unit drives a hydraulic valve body through seven electromagnetic actuators. Six of the seven actuators are ON/OFF solenoids. These ON/OFF solenoids are used to operate a series of shift valves which are disposed in hydraulic circuitry connecting a source of hydraulic pressure fluid with each of the friction engaging elements. Two of the ON/OFF solenoids are used to operate two pressure regulators which contribute to the unique shift quality aspect of the instant invention. The seventh actuator is a proportional or variable pressure solenoid whose output is multiplexed to three pressure hydraulic regulators in a manner controlling all upshifts, downshifts and lockup clutch operations while concurrently offering a redundancy feature which insures reliability of the instant invention for commercial applications.

Unlike conventional hydraulic or "partially" hydraulic electronic units, the control logic of the present invention is almost totally contained within programmable software. The control valve body has been reduced to a simple hydraulic driver. Consequently, twelve valves and two accumulators have been eliminated. Aside from improved control capability this offers the added advantage of reduced package size/weight and pump size. Contained within the software is the ability to control all shift schedule and shift quality aspects with full temperature compensation for the latter.

In its preferred form, the valve body of the present invention may include: line pressure regulator means; solenoid supply regulator means; band apply regulator means; clutch apply regulator means; a 4/3 sequence valve; four shift valves; a manual valve; and, the seven previously mentioned solenoids. Because this transmission further includes a lockup clutch, the valve body may accordingly further includes: lock-up clutch regulator means; and, valve means for controlling the flow of actuating fluid to the lock-up clutch regulator means. All upshifts are accomplished by simultaneously changing the state of: a shift valve or valves; the band and/or clutch regulator valve; and, sending the variable pressure solenoid through a programmable profile which drives the band and/or regulator valves. Such a programmable profile for the variable pressure solenoid allows more flexibility in shaping the solenoid's pressure output and thereby the effectiveness of the related friction unit. The shift or event is completed by again changing the state of the band and/or clutch regulator concurrentlty with sending the variable pressure solenoid to maximum pressure. All downshifts are accomplished by simultaneously switching or changing the present state of the applicable band and/or clutch regulator valve and sending the variable pressure solenoid through a programmable ramp function. The event or shift is completed by concurrently switching the state of the applicable regulator valve, switching the shift valve, and sending the variable pressure solenoid to maximum pressure. By sending the variable pressure solenoid to maximum pressure a redundancy feature is added which insures accomplishment of the event or shift. Hydraulically speaking, such a control system is a "hard" system. Although some compliance is offered by the hydromechanical actuators, there are no accumulators to absorb pressure overshoots and limit cycles.

In view of the above, a primary object of this invention is the provision of a control system for an automatic transmission which provides a method of controlling shift feel or quality without the use of accumulators.

Another object of this invention is the provision of a control system for an automatic transmission which provides an improved control approach through independent execution of any shift through various actuators controlling a series of shift and regulator valves.

Another object of this invention is the provision of an automatic transmission control system having the ability to shape pressure traces and durations using software rather having to modify valve body hardware.

Still another object of this invention is the provision of an automatic control system which provides an independence between line pressure control and shift quality control.

A further object of this invention is the provision of an automatic control system which is more reliable due to the absence of orifices and the use of an ON/OFF solenoid to effect a boost in line pressure yet has a reduced size and weight package.

BRIEF DESCRIPTION OF THE DRAWINGS

Referring now to the drawings, the control system of the present invention is illustrated to enable those skilled in the art to readily understand the function, operation, construction and advantages of same when read in conjunction with the accompanying drawings in which:

FIG. 1 is a schematic view illustrating the environment in which the present invention may find utility;

FIG. 2 is a longitudinal section view of a transmission mechanism with which the control system of the present invention is intended to be used;

FIG. 3 is a longitudinal section view of one of the actuating mechanisms associated with the transmission;

FIG. 4 is a longitudinal section view of another actuating mechanism associated with the transmission;

FIG. 5 is a schematic layout diagram for combining FIGS. 6, 7, 8, 9 and 10 illustrating a control system of the present invention;

FIG. 11 pictorialy illustrates the control strategy of the present invention;

FIG. 12 schematicaly illustrates a simple system overview of the various software programs included within the control system of the present invention;

FIG. 13 is a flowchart illustrating the ramping program executed by the electronic control unit of the present invention;

FIG. 16 schematically illustrates various positions of a manual valve associated with the present invention.

DETAILED DESCRIPTION OF THE PRESENT INVENTION

Figure 6:
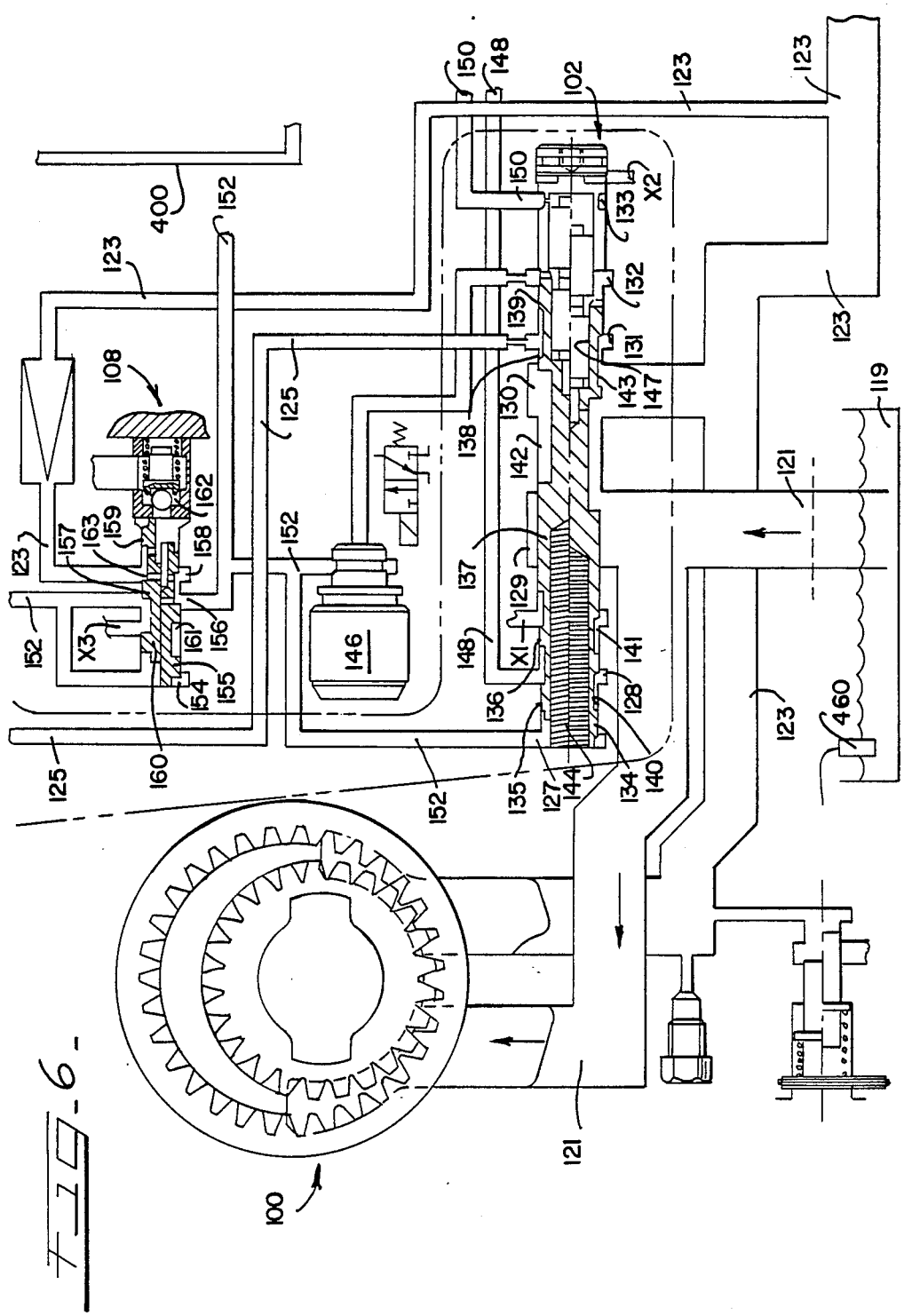

Referring now to the drawings, wherein like reference numerals indicate like parts throughout the several views, in FIG. 1 there is schematically illustrated a power train assembly for a vehicle. The power train assembly includes an internal combustion engine 10 including a conventional electric spark timing system and having a carburetor 12 with a spindle mounted valve 14 adapted to regulate the air intake to the carburator. That is, the valve 14 opens in degrees and rotates about the axis of a spindle 15 mounted on the carburator wherein an intake manifold vacuum develops. An operator controlled actuator 16 is connected to the valve 14 through suitable force transfer or linkage means 18. Coupled to the engine 10 and to be driven thereby is a transmission system 20 which is conditionable to drive the vehicle in either forward or reverse directions. The transmission system 20 includes a planetary gear transmission 22 of modular construction and having a casing or housing 24 with a planetary gear train 21 (FIG. 2) capable of providing a plurality of operating states. In the preferred embodiment, the transmission 22 has the capability of providing four forward and one reverse speed outputs through a transmission output shaft 26.

Turning now to the schematic illustration of the transmission system in FIG. 2, a conventional torque converter 28, including a lock-up clutch 30, drivingly connects an input shaft 32 of the transmission 22 to a crankshaft 34 of the engine 10. As is conventional, the lock-up clutch 30 includes an apply chamber 31 and a release chamber 33 (FIG. 7). The torque converter 28 includes a pump or impeller element 36 which is operably driven by the engine 10. The torque converter also includes a turbine member 38 connected to the input shaft 32 of the transmission. A stator or reaction element 40 is included in the torque converter interposed between the turbine member 38 and the impeller 36. The stator is fitted to an inner casing 42 of the transmission housing through a one-way clutch 44. The one-way clutch holds the stator stationary as the turbine is driven by the impeller prior to the coupling speed being obtained within the converter at which time the stator rotates with the impeller and the turbine.

In the preferred embodiment, a Ravigneaux type planetary gear train 21 is used in the transmission 22 to produce the four forward and one reverse gear ratios as certain gears or combination of gears are held or driven. The planetary gear arrangement illustrated and described in FIG. 2 may be similar in construction to the planetary gearing arrangement disclosed in U.S. Pat. No. 3,165,946 issued to R. W. Wayman on Jan. 19, 1965 the entirety of which is incorporated herein by reference. Reference thereto may be had for a more complete description of transmission construction. Suffice it to say, the illustrated and presently preferred gear train is comprised of a series of intermeshing rotary elements including a primary sun gear 50 fixed on a rotatable hollow shaft 52, a secondary sun gear 54 fixed to a drum 56, primary and secondary pinions 58 and 60, respectively, held on a common pinion carrier 62 which, in turn, is fixed to an intermediate rotatably mounted shaft 64, and an internal ring gear 66 that is fixed to the transmission output shaft 26. As is conventional, planetery pinions 58 and 60 are capable of performing rotation and revolution simultaneously while meshing with the internally toothed gear 66 and sun gears 50 and 54. As may be appreciated, the transfer of power through the transmission for the various operating states or gear ratios is dependent upon the combination of gears held while driving.

In order that some gears or combinations of gears in the gear train are held while other gears are driven to produce motion and gear ratios through the tranmission, a plurality of fluidically actuable friction units including clutches and bands are provided. The presently preferred embodiment is configured with four clutch assemblies, two bands, and two sprags or one-way clutches. All of the above units have been sized to provide low shift energies and high static capacities when used with low static coefficient oils. A multiple disc clutch C1 (3rd & 4th gear Clutch) operatively connects the transmission input shaft 32, driven by the turbine 38, to the intermediate shaft 64. Hydraulic pressure applies the clutch. When the clutch C1 is applied or locked together, the pinion gear carrier 62 is locked to the transmission input shaft 32. Another multiple disc, hydraulically actuated clutch C4 (Overrun Clutch) operatively connects the transmission input shaft 32 to the hollow shaft 52 telescopically arranged about the intermediate shaft 64. When the clutch C4 is applied or locked togther, the primary sun gear 50 is locked to the transmission input shaft 32. The transmission further includes hydraulically actuated clutch C2 (forward gear clutch). In a conventional manner, clutch C2 intermittently serves to operably connect the transmission shaft 32 to the hollow shaft 52 through a one way clutch holding member 63. Yet another hydraulically actuated clutch C3 (Reverse Gear Clutch) is operably disposed intermediate the transmission input shaft 32 and the secondary sun gear 54. When the clutch C3 is applied or locked together, the secondary sun gear 54 is locked to the transmission input shaft 32.

Brakes or Bands B1 and B2 are also provided in the transmission. As is known, brakes B1 and B2 are operable under the influence of independent servos or control pistons 69 and 71 (FIGS. 3 & 4). Each servo has a dual area design which allows smooth low-overrun shifts at high vehicle speeds without the addition of a regulator valve. Hydraulic pressure admitted to each servo piston applies the brake. As will be subsequently described, each servo includes a release spring which aids in the piston's return when hydraulic pressure is released from the servo. When applied band B1 (2nd & 4th Gear Band) anchors the secondary sun gear 54 by braking the drum 56 on which the sun gear 54 is fixed. Likewise, when band B2 (Reverse Band) is applied, it anchors the pinion gear carrier 62 to the transmission casing 24. It should be noted, however, although pinion gear carrier 62 may be prevented from rotating, the pinion gears 58 and 60 are permitted to revolve about their respective axes. A second one way clutch or holding member 65 is conventionally disposed between the planetary gear carrier 62 and the transmission casing 24.

The servo piston 69 is designed to operate under hydraulic pressure and is effective to apply band B1 during the second and fourth forward drive gear ratios. As best seen in FIG. 3, servo 69 includes a housing 70 having a relatively large interior chamber 72, an end cover 73, and a band apply actuator rod 74 journalled in a bore of the housing and adapted for axial displacement relative to said housing. An annular piston 75 is mounted for axial movement in the chamber 72 and is connected to one end of the actuator rod 74. The piston 75 is designed to define at least two independent fluid receiving annular chambers 76 and 77 between it and the end cover 73. Chambers 72, 76 and 77 are each connected to a separate fluid communication line or conduit. That is, an aperture 78 in housing 70 communicates chamber 72 with one fluid line while another aperture 79 in the housing 70 communicates chamber 76 with another fluid line. Chamber 77 communicates with another aperture 80 in the housing 70 through axial and radial bores 81 and 82, respectively, provided in the actuator rod 74. A separate fluid line is connected to aperture 80. Suitable resilient means 83 and 84, preferably in the form of compression springs, aid in the return of piston 75 to its initial positions shown when little or no pressure is communicated to either chamber 76 or 77.

Like servo piston 69, servo piston 71 is designed to operate under hydraulic pressure and is effective to apply Band B2 when the operator selects Reverse gear. As best seen in FIG. 4, the servo piston 71 includes a housing 85 having an interior chamber 86, and end cover 87 and an annular piston 88. The piston 88 is mounted for axial displacement relative to said housing and is operably connected to a band actuator rod 8. The piston 88 is designed to define at least two independent fluid receiving annular chambers 90 and 91 between it and the housing 85. Each chamber 90 and 91 is connected to a separate fluid communication line or conduit. That is, an aperture 92 in housing 85 communicates chamber 90 with one fluid line. The other chamber 91 communicates with a separate fluid communication line through aperture 93 provided in housing 85. Suitable resilient means 94, preferably in the form of a compression spring disposed between piston 88 and end cover 87, serves to return the piston 88 to its initial position when little or no pressurized fluid is communicated to either chamber 90 or 91. Suitably located apertures 95 provided in end cover 87 permit any fluid collecting in chamber 86 to escape without effecting the performance of the pistons.

In the above described power transmission mechanism, the rotational state of each rotary element (50, 54, 58, 60 and 66) of the gear set 21 can be veried by a relatively actuating or a combination of clutches C1, C2, C3, C4, one way clutches 63 and 65, and brakes B1, and B2. As will be readily understood, varying the rotational state of each of the rotary elements permits the revolution speed of the transmission output shaft 26 to be varied or conditioned relative to that of the input shaft 32. The four forward speed ratios and one reverse speed ratio are produced if the clutches C1, C2 and C3 and brakes B1 and B2 are engaged in the manner as shown in the following table:

| GEAR | GEAR RATIO | C1 | C2 | C3 | C4 | B1 | B2 | 1-2 OWC | 3-4 OWC | CONVERTER CLUTCH |
|---|---|---|---|---|---|---|---|---|---|---|
| 1st | 2.393 | | X | | | | | X | | |
| 2ND | 1.450 | | X | | X | X | | | | |
| 3RD | 1.000 | X | X | | X | | | | X | X |
| 4TH | 0.677 | X | X | | | X | | | | X |
| REVERSE | 2.094 | | | X | | | X | | | |
| MANUAL 1ST | 2.393 | | X | | | X | X | | | |

In the Table, an "X" denotes an actuation state of the clutch or brake. The gear ratios are exemplary and is a ratio of the revolution number of the input shaft 32 to that of the output shaft 26. An "X" below the 1-2 OWC and 3-4 OWC means that the first to second and third to fourth gear shits are produced owing to the action of the one-way clutches 63 and 65. More specifically, when the transmission operates in its drive range, the 1-2 shift is accomplished by applying the B1 band and overrunning the 1-2 sprag. The 2-3 shift is accomplished by applying the C1 clutch concurrent with removing the B1 band. The 3-4 shift is accomplished by reapplying the B1 band and overunning the 3-4 sprag. Clutch C3 and B2 band are applied to accomplish reverse. Clutch C4 is applied in manual ranges 3, 2, 1 to provide overrun braking. Clutch C4 is also applied in drive range for second and third gears to alleviate objectionable "freewheel" coasting. Band B2 may be applied in manual range 1 to accomplish the engine braking.

The transmission 22 is controlled by an electro/hydraulic control system which is responsive to changes in vehicle operating conditions. As will be described in detail hereinafter, an electronic control unit combined with hydraulic logic and control valves control all gear shifts and two independent shift schedules. The electronic control unit responds to signals indicative of the vehicle's operating conditions and drives a plurality of hydraulic valves through a plurality of electromagnetic actuators. The majority of these actuators are ON/OFF solenoids which are used to: operate a series of shift valves; and, control two pressure regulators in a manner regulating shift feel. At least one of the actuators is a proportional solenoid capable of developing a variable pressure output which is multiplexed to various pressure regulators. The variable pressure output controls all upshift, downshift, and, if so provided, lock-up clutch operation.

The preferred hydraulic system of the present invention includes a pump 100, driven by the impeller 36, arranged in series with the following Valves or control elements: Line Pressure Regulator Valve 102; Manual Valve 106; Solenoid Supply Regulator Valve 108; a Shift Feel Module 109 including a Band Apply Regulator Valve 110, and a Clutch Apply Regulator Valve 112 with Valves 110 and 112 being controlled by a variable pressure actuator; Converter Clutch Regulator Valve 114; Converter Clutch Control Valve 116; and, a Shift Valve Module 117 including ½ Shift Valve 118, ⅔ Shift Valve 120, ¾ Shift Valve 122, 4/3 Sequence Valve 124, Clutch Bias Valve 126, and a plurality of actuators.

All upshifts are accomplished by simultaneously switching one or more Shift Valves, the Band and/or Clutch Apply Regulator Valves, and sending the variable pressure actuator through a programmable profile. The shift or event is completed by having the Regulator Valve change state and sending the variable pressure actuator to maximum pressure. All downshifts are accomplished by simultaneously switching on one or both of the Regulator Valves and sending the variable pressure actuator through a programmable current profile. The downshift is completed by concurrently switching the Regulator Valve to the opposite state, switching the shift valve, and sending the variable pressure actuator to maximum pressure.

As may be best illustrated in FIG. 6, oil is supplied to the hydraulic system by the transmission's oil pump 100 and is regulated by the line Pressure Regulator Valve 102. The pump 100 is a conventional fixed displacement gear type pump which draws fluid from a reservoir 119 through a Pump Intake Circuit defined by conduit 121. A Line Pressure Circuit defined by conduit 123 connects the governor or Regulator Valve 102 to the Manual Valve 106 (FIG. 8) and the Solenoid Supply Regulator Valve 108. A Converter Feed Circuit defined by Conduit 125 also connects the Regulator Valve 102 to the Converter Clutch Control Valve 116 (FIG. 7). The Line Pressure Regulator Valve 102 is designed, however, to restrict or stop the supply of oil to the Converter Clutch Control Valve 116 if the oil demand in the Line Pressure Circuit 123 has not been fully satisfied. Similarly, the Line Pressure Regulator Valve 102 will not allow oil to flow to the Pump Intake Circuit 121 until the demand of the Convertor Clutch Control Valve 116 has been fully satisfied.

The Line Pressure Regulator Valve 102 has a series of ports 127, 128, 129, 130, 131, 132 and 133 including exhaust ports X1 and X2. The Valve 102 further includes a reciprocally arranged spool 134. The spool 134 has a series of lands 135, 136, 137, 138 and 139 with annular grooves 140, 141, 142 and 143 between the lands. It should be appreciated that the cross sectional area of land 137 is greater than that of 136. Moreover, the cross sectional area of land 136 is greater than that of land 135. As will be understood, the regulated line pressure supplied by the Valve 102 to the Line Pressure Circuit 123 through port 130 is determined by a differential action between a biasing force, provided in the preferred embodiment by a biasing spring 144 acting on one end of spool 134, and the fluid forces acting on the spool 134. Port 132 of Valve 102 opens to an axially extending bore 147 provided in the spool 134 opposite the spring 145. As will be subsequently described, port 128 of Valve 102 opens to a conduit 148 defining a Reverse Circuit. The opposite end of the Reverse Circuit 148 opens to the Clutch C3 and chamber 90 of the B2 Band 71. Port 133 opens to a 3rd Gear Circuit defined by conduit 150. Port 132 of Valve 102 allows communication between bore 147 and an actuator 146 controlled by an ON/OFF solenoid. When so desired, the pressure in Line Pressure Circuit 123 can be modulated by applying the fluid output signal of the actuator 146 against the spool 134.

As mentioned above, fluid is delivered, at a regulated line pressure, to the Solenoid Supply Regulator Valve 108 through the Line Pressure Circuit 123. The purpose of the Solenoid Supply Valve 108 is to supply fluid at a constant pressure through a supply Conduit 152 to each of the plurality of electromagnetic actuators disposed throughout the hydraulic system. The output pressure of the Solenoid Supply Regulator Valve 108 is also used to provide a shifting impetus for many of the shift valves in the hydraulic system.

The Solenoid Supply Valve 108 is provided with a plurality of ports 154, 156, 158, and an exhaust port X3. The Valve 108 also includes a reciprocally arranged spool 160 having lands 155, 157, and 159 with annular grooves 161 and 163 therebetween. Line pressure from Valve 102 is supplied to port 158 of the Valve 108 to act on one end of the spool 160. A Pressure Relief Check Valve 162 limits this pressure thus producing the desired pressure on the spool 160. Ports 154 and 156 are connected to establish a solenoid supply feedback pressure loop, having a magnitude equal to the pressure set by the Check Valve 162, to act on the opposite end of the spool to achieve equilibrium thereof.

Turning to FIG. 8, the Manual Valve 106 is provided with a spool 164 which is manually displaced by a shift lever 165 convenientantly disposed or arranged for operator access and has shift positions: "P" representing Park (transmission Neutral); "R" representing Reverse (Clutch C3 and band B2 applied); "N" representing Neutral (no drive elements engaged); "D" representing Drive (alternative clutches and brakes being applied to automatically attain forward speed ratios as will be subsequently described); "3" representing automatic upshifts and downshifts between the first, second and third forward gear drive ratios; "2" representing automatic upshifts and downshifts between first and second gear drive ratios and, "1" representing low speed wherein no automatic upshifts are permitted to occur. In the respective shift positions, the purpose of the Manual Valve 106 is to connect the regulated line pressure fluid in the Line Pressure Circuit 123 to any of three distinct circuits or lines including Reverse, Drive and Low leading from Valve 106. As may be best illustrated in FIG. 16, the Valve 106 is shiftable into four distinct operational states. The four operational states of the Valve 106 are; (1) a "Blocked" state wherein Park and Neutral positions are achieved; (2) a "Reverse" state for effecting Reverse Gear operation; (3) a "Drive" state for effecting forward drive gear ratios; and, (4) a "Low" state wherein the transmission operates only in the first forward gear drive ratio.

The Manual Valve 106 has a plurality of ports including ports 165, 166, 167, 168, 169, 170 and exhaust port X4. The spool 164 is provided with lands 172 and 714 having an annular groove 173 disposed therebetween. Port 165 opens to the Reverse Circuit 148. Ports 167, 168 open to the Drive Circuit defined by conduit 175. Ports 169, 170 open to a Low Circuit defined by conduit 177.

The ½ Shift Valve 118 defines a part of the hydraulic logic associated with the present invention. As illustrated in FIG. 8, the ½ Shift Valve 118 is provided with a plurality of ports 180, 182, 184, 185, 186, 188, and 189 and includes exhaust ports X5, X6 and X7. Valve 118 also includes a reciprocally arranged spool 190 having lands 192, 194, 196, 198 and 200 with annular grooves 193, 195 and 197 therebetween. The linear disposition of spool 190 is controlled by the fluid pressures acting thereagainst. It should be noted that the cross sectional area of land 200, disposed at one end of spool 190, is greater than the cross sectional area of land 192 at the opposite end of spool 190. Port 180 of Valve 118 opens to the Supply Circuit 152 which provides an impetus to shift spool 190 in a first axial direction. Port 182 of Valve 118 opens to a Band Apply Feed Circuit defined by conduit 202. Port 184 opens to a portion of the Drive Circuit 175 leading from Manual Valve 106. Port 185 opens to a 2nd Gear Circuit defined by conduit 204. Port 186 opens to a Lo-1st Circuit defined by conduit 206. The opposite ends of the Lo-1st Circuit 206 open to Clutch C4 and chamber 91 of the Band B2 piston 71. Port 188 opens to a portion of the Lo Circuit 177 leading from the Manual Valve 106. Port 189 of Valve 118 opens to a conduit 208 which communicates fluid from the ⅔ Shift Valve 120 and the ¾ Shift Valve 122.

As illustrated in FIG. 8, the 2/3 Shift Valve 120 is provided with a plurality of ports 210, 212, 214 and 216 including exhaust ports X8 and X9. Valve 120 further includes a reciprocally arranged spool 218 having lands 220, 223 and 224 provided thereon with an annular groove 221 provided between lands 220 and 222. It should be noted that land 224 is greater in cross sectional area than is land 220. The position of spool 218 is controlled by the oppositely directed fluid pressure acting against the spool 218. Port 210 opens to the Supply Circuit 152 which provides an impetus to shift spool 218 in one direction. The opposite end of spool 218 is exposed to the output pressure signal of an electromagnetic actuator 222 controlled by an ON/OFF solenoid. Fluid is supplied to the actuator 222 through the supply Circuit 152. Port 212 opens to the 2nd Gear Circuit 204 leading from port 185 of the 1/2 Shift Valve 118. Port 214 opens to the 3rd Gear Circuit 150 one end of which opens to port 133 of Line Pressure Regulator Valve 102. Port 216 opens to a conduit 226 which communicates fluid to the ½ Shift Valve 118.

The ¾ Shift Valve 122 is provided with a plurality of ports 230, 232, 234, 236, 238, 240, 242, and 244 and includes exhaust ports X10, X11 and X12. Valve 122 also includes a reciprocally shiftable spool 246 having lands 248, 250, 252, 254 and 256 with annular grooves 249, 251, 253 and 255 disposed therebetween. It should be noted that land 256 has a greater cross sectional area larger than that of land 248 arranged at the opposite end of the spool 246. The linear position of spool 246 is controlled by the fluid pressures acting against the spool 246. Port 230 opens to the Supply Circuit 152 which provides an impetus to shift spool 246 in one direction. The opposite end of spool 246 is exposed to the output pressure signal of an electromagnetic actuator 260 controlled by an ON/OFF solenoid. Fluid is supplied to the actuator 260 through the Supply Circuit 152. Port 232 opens to a portion of the Drive Circuit 175 leading from the Manual Valve 106. Port 234 opens to a overrun Clutch Circuit defined by a conduit 262. Port 236 opens to a Band B1 Apply Circuit defined by a conduit 264 whose opposite end opens to chamber 77 (FIG. 3) of piston 69. Port 238 opens to the Band Apply Feed Circuit 202. The other end of the Band Apply Feed Circuit 202 opens to chamber 76 (FIG. 3) of piston 69. Port 240 of Shift Valve 122 opens to a conduit 266 the opposite end of which leads to the 4/3 Sequence Valve 124. Port 242 opens to a Band B1 Release Circuit defined by a conduit 268 the opposite end of which opens to chamber 72 (FIG. 3) of piston 69. Port 244 opens to a conduit 270 which communicates fluid to the ½ Shift Valve 118.

Turning now to FIG. 9, the 4/3 Sequence Valve 124 defines part of the hydraulic logic associated with the Control System. The 4/3 Sequence Valve 124 is provided with ports 272, 274, 276, 278 and 280. Valve 124 also includes a resiliently biased spool 282 having lands 284 and 286 with an annular groove 285 disposed therebetween. Port 272 opens to a portion of the Clutch Apply Feed Circuit defined by conduit 288. The Clutch Apply Feed Circuit 288 introduces fluid to one end of the spool 282, on one side of land 284, in a manner acting to linearly move the spool 282 against the action of a biasing spring 287. Port 274 also opens to the Clutch Apply Feed Circuit 288. When spool 282 is disposed to one extreme, fluid from the Feed Circuit 288 acts against the cross sectional area of land 284. Port 276 opens to the conduit 266 leading from the port 240 of Valve 122. Port 278 opens to the 3rd Gear Circuit 150 leading from the port 214 of Valve 120. Port 280 opens to the Band B1 Release Circuit 268 leading from port 242 of Valve 122.

Like Valve 188, the Clutch Bias Valve 126 further defines hydraulic logic associated with the present invention. The purpose of Valve 126 is to prevent actuation of the hydraulic lockup clutch 30 in other than 3rd or 4th gear drive ratios. The Clutch Bias Valve 126 is provided with a plurality of ports 289, 290, 292 and 294 and includes exhaust port X13. Valve 126 also includes a reciprocally arranged, resiliently biased spool 296 having lands 298, 300 and 302 with annular grooves 291 and 293 therebetween. The linear position of the spool 296 is controlled by the fluid pressures acting thereagainst and the influence of a spring 304. One end of spool 296 is exposed to fluid pressure in the Clutch Apply Feed Circuit 288. The Clutch Apply Feed Circuit 288 introduces fluid to port 289 of Valve 126 in a manner acting to conjointly move the spool 296 with the action of the biasing spring 304. Ports 290 and 294 of Valve 118 open to the Supply Conduit 152. Port 294 opens to the opposite end of spool 296. The fluid pressure in the Supply Conduit applies a linear force to the spool urging it in an opposite direction to that of spring 304 and the pressure of the Clutch Apply Feed Circuit 288. Port 292 of Valve 118 opens to a conduit 301 leading to actuator 332 and which supplies fluid thereto when spool 296 is disposed to so permit.

Turning now to FIG. 7, the Converter Clutch Control Valve 116 is provided with a series 307, 308, 310, 312, 314, 316 and 318 and exhaust ports X15 and X16. Valve 116 also includes a reciprocally arranged spool 320 having lands 322, 324, 326, 328, 330 and 331 with annular grooves 323, 325, 327 and 329 disposed therebetween. The linear position of the spool 320 is controlled by the fluid pressures acting thereagainst. Fluid pressure from the Supply Conduit 152 is delivered to port 307 and acts against one end of the spool in a manner urging the spool in an axial direction. Spool 320 is further provided with a radial port 319 which intersects with a blind axial bore 321 opening to one end of the spool 320. The opposite end of spool 320 may be exposed to the output pressure signal of an electromagnetic actuator 332 controlled by an ON/OFF solenoid. Port 308 of Valve 116 opens to a Lock-up Clutch Release Circuit defined by conduit 334. The opposite end of the Lock-up Clutch Release Circuit 334 opens to the release chamber 33 of the lockup clutch 30. Port 310 opens to the Converter Feed Circuit 125, the opposite end of which opens to port 131 of the Regulator Valve 102. Port 312 opens to a Cooler Circuit defined by conduit 338. Conduit 338 leads from port 312 to a conventional oil reservoir cooler apparatus 340 from whence fluid is returned to the reservoir 119. Port 314 of Valve 116 opens to a Lock-up Clutch Apply circuit defined by conduit 342. The opposite end of Lock-up Clutch Apply Circuit 342 opens to the apply chamber 31 of the lockup clutch 30. Port 316 opens to a Regulator Apply Feed Circuit defined by conduit 344. Port 318 opens to a fluid conduit 346 leading to the Converter Clutch Regulator Valve 114. Because of the unique spool construction associated with Valve 116, fluid from the Supply Conduit 152 flows into the axial bore 321 and radial port 319 through port 318 and, ultimately, to the Converter Clutch Regulator Valve 114.

As illustrated in FIG. 7, the Converter Clutch Regulator Valve 114 is provided with ports 352, 354 and includes exhaust port X17 which is blocked. Valve 114 also includes a reciprocally arranged spool 356 having, on its outer periphery, lands 358 and 360 with an annular groove 359 disposed therebetween. Spool 356 also includes one or more radial ports 362 which intersect with an axial blind bore 364 opening to one end of the spool 356. Port 354 opens to the conduit 346 which communicates fluid from the Supply Conduit 152. As such, fluid from the Supply Conduit 152 acts against the spool 356 in a manner urging it in an axial direction. Port 352 opens to the Regulator Apply Feed Circuit 344 which opens at its other end to port 316 of Valve 116. As mentioned above, fluid from the Supply Conduit 152 flows through the axial bore 321 and radial port 319 of Valve 116 from whence it is delivered to port 354 of Valve 114. Supply Conduit fluid flows from port 354 into port 352, through port 362 and into the axial bore 364 in a manner applying a force to the spool 356 in the direction opposite to that applied to the other end thereof. The force applied to the other end of the spool 356 is established by fluid pressure communicated to Valve 114 through a Variable Pressure Circuit 400 leading from the Shift Feel Module 109.

Turning now to FIG. 10, another salient feature of the present invention is the provision of a Shift Feel Module 109. Unlike other systems which use accumulators to effect smooth shifts, absorb pressure overshoots, and to limit cycles, the present invention provides the Shift Feel Module 109 for effecting a smooth, transitional shift between gear ratios. Moreover, the provision of a Shift Feel Module adds a redundancy feature to the control system operation to insure reliability for commercial applications. As mentioned above, the Shift Feel Module 109 includes the Band Apply Regulator Valve 110, the Clutch Apply Regulator Valve 112 and a variable pressure actuator 372 whose output is multiplexed to drive the Pressure Regulator Valves 110, 112 either independently or together depending on the specific shift event and the Regulator Valve 114 if a lockup clutch is used in combination with the invention. It should be noted that the actuator 372 produces a pressure output which is inversely proportional to the value of the current or signal used to drive the actuator.

As will become apparent from the description which follows, all automatic upshifts and downshifts involve the B1 Band or the C1 Clutch. Clutch C4 does not play any part in the shifting, but is simply applied to overcome "free wheel coasting" in the drive range. Because all automatic shifts involve the B1 Band or the C1 Clutch, the method of applying these friction elements is paramount to whether the gear shift or change is considered to be smooth or harsh. The respective Band Apply and Clutch Apply Regulator Valves 110, 112, respectively, are directly responsible for the "smooth" application of the friction elements. The Regulator Valves 110, 112 operate to amplify the pressure output supplied by the Variable Pressure Solenoid 372 which exists in an inverse relationship to a programmable current value developed per shift event. The amplification factors (i.e., 2:1, 3:1, etc.) are purely a function of the pressure requirement at the particular shift event versus the pressure available from the Variable Pressure Solenoid 372. Since the preferred form of this transmission has two shifting elements, two Regulator Valves are provided to control them. It follows that if there were a transmission having twenty shifting elements, then the Shift Module 109 may include twenty Regulator Valves all controlled by a single Variable Pressure Solenoid whose output would be multiplexed to all twenty Regulator Valves through their respective ON/OFF solenoid actuators. From the above, it should be apparent that the control concept offered by the Shift Feel Module 109 is both flexible and "scalable" to other applications.

As illustrated in FIG. 10, the Band Apply Regulator Valve 110 of Module 109 is provided with a plurality of ports 374, 376, 378, 380 and further includes exhaust ports X18 and X19. Valve 11 further includes a reciprocally arranged, two piece spool 382 whose linear disposition is controlled as a function of the fluid forces applied thereagainst. Spool 382 is resiliently biased in one direction under the influence of a spring 383. Spool 382 is also exposed to the output pressure signal of an electromagnetic actutor 402 controlled by an ON/OFF solenoid. Fluid is supplied to the actuatr 402 through the supply Circuit 152. In its present form, spool 382 includes first and second members 385 and 387 respectively. On its periphery, member 385 of spool 382 includes lands 384, 386 and 388 with annular grooves 381 and 389 therebetween. It should be noted that the cross sectional area of land 388 is greater than that of lands 384 and 386. On its periphery, member 387 of spool 382 includes lands 390 and 392 with an annular groove 391 provided therebetween. Member 387 of spool 382 further includes one or more radial ports 394 which intersect with a blind axial bore 396 into which a pilot 398 projecting from spool member 385 extends. Port 374 of Valve 110 opens to the 2nd Gear Circuit 204 whose opposite end opens to port 196 of the ½ Shift Valve 118 Ports 376 and 378 of Valve 110 open to the Band Apply Feed Circuit 202 whose opposite ends open to chamber 76 of servo 69 associated with the B1 band and to port 182 of the ½ Shift Valve 118. Port 380 of Valve 110 opens to a portion of a Variable Pressure Circuit defined by conduit 400.

The Clutch Apply Regulator Valve 112 of Module 109 is provided with a plurality of ports 408, 410, 411, 412 including exhaust ports X20 and X21. Valve 112 further includes a reciprocally arranged spool 414 whose linear disposition is controlled as a function of the fluid forces applied thereagainst. Spool 414 is resiliently biased in one direction under the influence of a spring 416. Spool 414 is also exposed to the output pressure signal of an electromagnetic actuator 418 controlled by an ON/OFF solenoid. The output pressure signal of actuator 418 acts in a direction opposite to that of spring 416. Fluid is supplied to the actuator 418 through the Supply Circuit 152. In its present form, spool 414 includes first and second members 420 and 422 respectively. On its periphery, member 420 of spool 414 includes lands 424, 426, and 428 with annular grooves 425 and 427 therebetween. It should be noted that the cross sectional area of land 428 is larger or greater than that of lands 424 and 426. On its periphery, member 422 of spool 414 includes lands 430, 432 with annular groove 431 disposed therebetween. Member 422 of spool 414 further includes one or more radial ports 434 which intersect with a blind axial bore 436 into which a pilot 438 projecting from spool member 420 extends. Port 408 of Valve 112 opens to the 3rd Gear Circuit 150 whose opposite end opens to port 214 of the 2/3 Shift Valve 120. Ports 410 and 411 of Valve 112 opens to the Clutch Apply Feed Circuit 288 whose opposite ends open to ports 272 and 274 of the 4/3 Sequence Valve 124 and to Clutch C1. Port 412 of Valve 112 opens to a portion of the Variable Pressure Circuit 400.

Also included in the Shift Feel Module 109 is a Variable Pressure Actuator 372 whose output is multiplexed to the Band Apply Regulator Valve 110, the Clutch Apply Regulator Valve 112, and the Converter Clutch Regulator Valve 114. Preferably arranged in close proximity to the output of the actuator 372 is a spring biased damper 440. As appreciated by those skilled in the art, the damper 440 serves to stabilize the actuator 372. The output signal of actuator 372 is deliverd to the above mentioned Valves through the Variable Pressure Circuit 400.

FIG. 11 schematically illustrates the preferred control strategy of the present invention. As illustrated, the Control System includes an Electronic Control Unit (ECU) 450 for regulating transmission operation through controlled energization of the various electromagnetic actuators 146, 222, 260, 332, 372, 402 and 418 (FIG. 12) arranged in combination with the hydraulic valve body which, in turn, controls the various engaging means in a manner producing motion and gear ratios through the transmission. The ECU 450 may include analogue and/or digital electronic calculation and logic circuitry, preferably microcomputer based, the specific configuration and structure of which forms no part of the present invention. The ECU 450 receives and may store electrical data or information derived from a plurality of input signals. Such input signals are provided by a plurality of sensors which monitor various vehicle characteristics and develop signals indicative thereof.

As seen in FIG. 11, Throttle Position Sensor 452 includes any suitable means capable of producing a signal ultimately used in calibrating engine torque. In its preferred form, Sensor 452 includes a potentiometer which is operably connected to the spindle 15 of the throttle valve 14 (FIG. 1) for indicating air intake to the engine. With such an arrangement, changes in the position of the engine throttle result in proportionately different electrical signal values being delivered to the ECU 450. Alternatively, engine inlet manifold vacuum or engine inlet air mass flow could be used in lieu of throttle positions as one of the function used to derive engine torque.

The Engine Speed Sensor 454 may utilize "trigger" pulses from the vehicle's electronic spark timing system to produce an output signal indicative of engine speed. Of course, any suitable means capable of indicating engine speed could be used to derive the input signal to the ECU 450.

The Rod Speed Sensor 456 includes a conventional pulse producing sensor. Sensor 456 monitors the revolutions of the transmission output shaft 26 (FIG. 1) and produces signals which may b used to calculate vehicle road speed.

The Transmission Oil Temperature Sensor 458 may include a thermistor element. As schematically illustrated in FIG. 6, a thermistor element 460 is suitably mounted in the transmission oil reservoir 119 for measuring the transmission oil temperature and producing a signal indicative thereof.

As mentioned above, the present invention affords the transmission two independent shift schedules. The "Economy" schedule optimizes fuel economy. The "Performance" schedule can be manually selected or will be automatically selected when the transmission oil temperature exceeds a predetermined level. Whether the transmission operates in the "Economy" or "Performance" mode may be selected through operation of a switch assembly 462 whose state serves as an input to the ECU 450. The ECU automatically returns to the "Economy" Shift Mode or schedule when the engine is restarted and provided the transmission oil temperature is below a threshold temperature value. A data link to the vehicle instrument cluster may be provided to visually indicate what mode or state has been selected by the operator.

The Gear Position Sensor 464 monitors the position of the shift lever 165 (FIG. 8) controlling the disposition of the Manual Valve 106. The output signal of Sensor 464 is operative to inhibit engine starting other than when the transmission is in either Neutral or Park. When the shift lever 165 is moved to Reverse "R", Sensor 464 provides a signal to activate "backup lights". Of course, the actual reverse gear drive is activated hydraulically when the shift arm 165 moves the Manual Valve 106 into an appropriate position. In addition to selectively inhibiting engine starting and activating "backup lights", Sensor 464 signals the ECU 450 as to which gear selection has been chosen by the vehicle operator.

Unlike conventional hydraulic or "partially" electronic units, the control strategy and logic for the transmission of this invention is almost totally contained within software provided in the ECU 450. That is, the ECU reads and calculates input data or signals received from Sensors 452, 454, 456, 458, 462 and 464 and performs shift point computation and logic by means of software 466; performs shift quality control through means of software 468; and, performs line pressure control through software 470. The Software Programs 466, 468 and 470 drive the hydraulic valve body which, in turn, selectively controls the clutches and bands. Loop time through the system is approximately 20 milliseconds. As will become apparent, the software is modular in nature for future enhancement.

The primary purpose of the Shift Schedule Software 466 is to automatically select the optimal gear ratio in which the transmission should be working. The Shift Schedule Softwre 466 has the capability to automatically command a gear change or shift into the selected optimal gear ratio based on present vehicle information processed by the ECU 450. As will be understood, such a gear change or shift will be effected by varying the rotational state of one or more of the elements in the gear train 21.

The primary purpose of the Shift Quality Software 468 is to provide a method by which "Shift Feel" between gears can be controlled or managed. The Shift Quality Software 468 further adds a unique redundancy feature to the system. This redundancy feature insures timely and appropriate actuation or energization of the engaging elements. It should be appreciated that the signal provided by the Software 468 to drive the Variable Pressure Solenoid associated with actuator 372 is at a "Current" which is inversely proportional to the hydraulic pressure output signal of the solenoid.

The purpose of the Line Pressure Control Software 470 is to selectively raise the fluid pressure in the Line Pressure Circuit 123. This may be accomplished when there are increased torque requirements to the transmission.

A simple system overview of the Software 466, 468 and 40 is schematically illustrated in FIG. 12. Software 466 includes a Desired Gear and Lockup Module 480 which includes shift and lock-up curves. Module 480 receives filtered input signals from the Trottle Sensor 452, Road or Shaft Speed Sensor 456, Temperature Sensor 458, Mode Switch Sensor 462, and Gear position Sensor 464. The output of Module 480 indicates the desired gear ratio in which the transmission should be operating and whether the lock-up clutch should be actuated.

Figure 14:
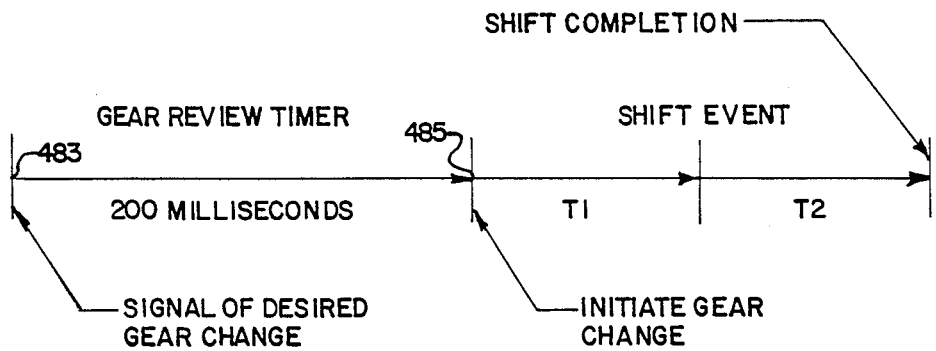
FIG. 14 schematically illustratees the role played by a gear review timer module associated with the present invention.

The output of Module 480 is received by a Gear Shift Review Timer Module 482. The puprose of Module 482 is to review whether a change in state or gearing is appropriate. FIG. 14 schematically illustrates the operation of Module 482. Reference point 483 in FIG. 14 indicates the receipt of a signal from Module 480 that a gear change is indicated from the input signals received. The Review Timer Module 482 simply delays the initiation of a shift event to more accurately determine what event the operator of the vehicle desires. After reviewing the signal for a predetermined time period, a gear change may be initiated as indicated at reference point 485. The magnitude of the Module delay is a programmable multiple of the 20 millisecond loop time. Since the microprocessor in the ECU 450 scans or reviews the input signals every 20 milliseconds, it would be impossible for the vehicle's operator to move the accellerator far/fast enough to signal a 4-2 downshift, for example. Without the Review Module 482, most if not all, events or gear changes would be sequenced as opposed to "Skip-Shift" events. A sequenced type of operation (4-3-2 shift pattern rather than a direct 4-2 shift) is very objectionable from a transmission response standpoint. The Review Timer is typically set between 80 and 240 milliseconds, depending upon the application.

Returning to FIG. 12, the signals from the Road Speed or Shaft Sensor 456 and the Gear Position Sensor 464 act as logic signals for aborting the signal from Module 480.

Having determined that an event or gear shift is in order, the output of Module 482 is delivered to Solenoid Controller Modules 484, 486 and acts as an input to the Shift Quality Software 468. Solenoid Controller Module 484 controls the ON/OFF solenoids associated with actuators 222, 260, 402 and 418. Solenoid Controller Module 486 controls the ON/OFF solenoid associated with actuator 332 for controlling lockup clutch operation.

Solenoid Controller Module 484 includes means for switching Solenoids 222, 260, 402 and 418 ON/OFF according to a predetermined pattern at predetermined times as a function of the input signals thereto. The patterns and times are stored in data tables included with each Solenoid Controller. Controller Module 484 receives filtered input signals from a plurality of sources. One signal is derived from Software Program 468 to activate a clock or timer associated with Module 484. Another filtered signal is received by Controller 484 from the Shift Review Timer Module 482, indicative of the current gear in which the transmission is operating. A filtered signal from the Gear Position Sensor 464 and a filtered signal from the Road or Shaft Speed Sensor 456 are also received by Controller 484. These signals act as logic signals for aborting a gear shift or event.

Solenoid Controller Module 486 includes means for switching solenoid 332 ON/OFF as a function of the input signal thereto. The filtered input signal to Module 286 indicates the desired lock-up state of lockup clutch 30. The desired lock-up state of lock-up Clutch 30 is compared to its existing state by Module 486 and the ON/OFF solenoid associated with actuator 332 is controlled accordingly.

Line Pressure Software Program 470 includes a Solenoid Controller Module 488 which controls the ON/OFF solenoid associated with actuator 146. Module 488 responds to several filtered input signals including signals from the Throttle Sensor 452, Road or Shaft Speed Sensor 456 and Gear Position Sensor 464. As mentioned above, the Control Softwre 470 selectively raises the fluid pressure in the Line Pressure Circuit 123 when the torque requirements of the transmission are proportionately raised.

The Shift Quality Software Program 468 includes a Torque Calculation Module 490. Data for the "Economy" and "Performance" shift schedules are programmed into the ECU 450. Eight different throttle-percent values with corresponding transmission output shaft speeds are set for each event. This is done for both the "Economy" and "Performance" schedules based upon: engine power characteristics; vehicle NVH (noise/vibration/harshness) signature; trailer class; vehicle road-load characteristics; and, fuel economy requirements. A "torque map" based upon the above shift schedules and engine torque curves is included as part of Module 490. Module 490 receives filtered input signals from the Engine Speed Sensor 454 and the Throttle Position Sensor 452. The signals serve as input to a 12×12 matrix of throttle percentage versus engine speed and are responsible for all part throttle shift quality aspects. This is accomplished by simple interpolation provided by Program 468 to drive actuator 372 between 0% and 100% torque current values which are established per shift event (1-2, 2-3, etc.). The function of Module 490 is to approximate the engine torque curve, in terms of current, for driving actuator 372, in twelve discrete segments. That is, at 20% throttle current values might be set for 1000, 1300, 170, 2000, 2300, 2700, 3000, 3300, 3700, 4000, 4500, and 5000 engine RPM's. Twelve such percent throttle lines comprise the torque map. Experience has shown this resolution to be quite adequate in describing the non-linear torque characteristic of engines. The engine torque curve signal is provided to the Solenoid Command Calculation Module 492. Other filtered signals from: Temperature Sensor 458; Throttle Position Sensor 452; Gear Position Sensor 464; and, the Shift Review Timer Module 482 are also provided to the Solenoid Command Calculation Module 492.

An example of the operation of the Calculation Module 492, which repeatedly executes a program stored in memory, will be described hereinbelow with reference to the symbolic representation illustrated in a flow chart format shown in FIG. 13. This program is in fact written in a computer language or in source code appropriate to the particular microcomputer used, but the intimate details thereof will not be explored herein because, based on the disclosure provided, they can be supplemented without difficulty in a form suited to any particular implementation by one of ordinary skill in the art without undue difficulty.

First, when the input sensors import to the ECU 450 that a gear change or shift is in oroder, the main program of the ECU 450 causes a control signal to enter the START block 500. In this start block 500, the microcomputer of the ECU initializes the various workspaces and so on in its RAM and prepares for operation. Then control passes to Step 502 where a torque routine is executed and where, based on engine speed and throttle position, engine torque is calculated in the manner described above. Control then passes to Step 504 whereat the friction element torque required to effect the shift or event is calculated. This calculation is a function of engine torque times the gain or scale factor necessary to be applied for developing a specific torque level at the on-coming friction element plus some minimum torque to compensate for preloads and other considerations of the friction element. This calculation is converted into an electrical "current" required by the electrically responsive valve actuator associated with the particular on-coming friction element to develop the torque required for effecting such a shift. The control from Step 504 is then passed to Step 506 which acts as an incremental shift timer. The shift timer presets the period of time over which the output signal of the Variable Pressure Solenoid 372 will be modified or ramped. At Steep 506, a decision is made whether the shift time involvd with the shift event or gear change is equal to or greater than 0.

Figure 15:
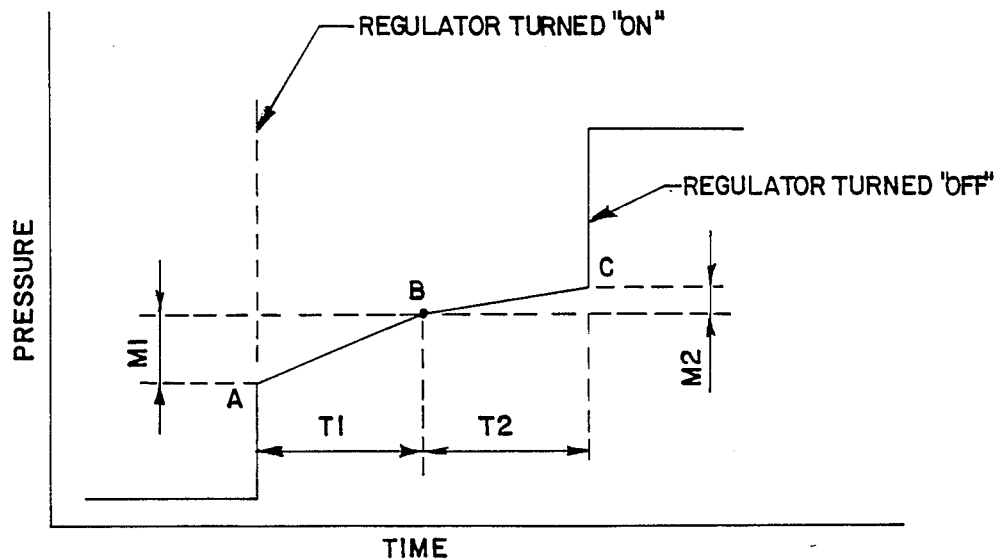
FIG. 15 schematically illustrates a typical pressure trace of a variable pressure solenoid associated with the present invention.

Understandably, only the first or initial loop pass will have a shift time equal 0. As such, control then passes to Step 508. At Step 508, ramp and throttle values are cleared and set to 0. From Step 508, control passes to Step 528. At Step 528, the signal to the Variable Pressure Solenoid 372 is raised in a predetermined manner. Initially, Step 528 causes the signal to the Variable Pressure solenoid to raise to point A as illustrated in FIG. 15. As the program progresses, the signal to the Variable Pressure Solenoid will be raised in a stepped or profiled function discussed hereinafter. From Step 528, control passes to Step 530. At Step 530, the shift timer is incremented and control is passed to Step 532. At Step 532, the expired time involved with this particular gear shift or event is compared to a predetermined value. If the shift time involved with this particular gear shift or event is equal to the predetermined value control passes to Step 534 which indicates that the shift or gear change is over. If the shift time involves with this particular gear shift or event is not equal to the predetermined value, control passes to Step 536 and the program is run again.

FIG. 15 illustrates a typical pressure trace ultimately developed by the variable pressure actuator 372 during a gear change or lockup. The pressure trace is accomplished by driving the actuator 372 through a ramping function or profile. The pressure profile for the actuator 372 has two current ramps AB and BC extending over times T1 and T2, respectively. Ramps AB and BC may have positive or negative slopes. Positive slopes may be referred to as "Ramp-up" and negative slopes may be referred to as "Ramp-down." Point A of ramp AB is established by the above described torque map. Offsets M1 and M2 and times T1 and T2 are programmable by shift event (1-2, 2-3). Hence, the shape of the curve is a function of starting point "A" and the other functions: nameley M1, M2, T1, and T2. The straight line sections AB and BC shown in FIG. 15 are actually comprised of a series of discrete steps at 20 millisecond sample periods and applitudes of 5 milliamps in resolution. During each sample period, the present ramp is updated based on present torque and throttle position. During a shift or lockup, torque is calculated based on engine speed and throttle at the beginning of the shift. Any torque change during a shift is due to a change in throttle position. Flexibility to "shape" the current trace is significant to optimise shift feel or quality.

Returning to FIG. 13, when the shift time involved with the gear shift or event is greater than 0, control passes to Step 510. A decision is made at Step 510 whether the ramp time involved with the gear shift is less than or equal to S1 where S1=T1/(20 msec.). If the rap time is less than or equal to S1, control then passes to Step 512. At Step 512, a goal for the ramp AB (FIG. 15) is calculated based on the the present throttle position. As seen in FIG. 15, the slope of AB is a function of the offset M1 and time T1. To reach this goal at the end of ramp AB requires calculating step size which is accomplished in Step 514. The step size needed for accomplishing the goal is calculated based on how many samples are remaining in the ramptime and changes due to previous updates in the throttle component.

On the other hand, if the number of samples S1 is more than T1(20 msec.), control passes to Step 518 whereat a goal for ramp BC (FIG. 15 is calculated based on present throttle position. As seen in FIG. 15, the slope of BC is a function of the offset M2 and time T2. To reach this goal at the end of ramp BC requires calculating step size which is accomplished in Stp 520. The step size needed for accomplishing the goal is calculated based on how many samples are remaining in the ramptime and the charges due to previous updates in the throttle component. From Step 520 control passes to Step 522 whereat the ramp timer is incremented.

The control passes from Step 514 to Step 516 which determines whether the expired number of samples is equal to S1. If the expired number of samples is equal to S1, control passes to Step 524. At Step 524, the ramp timer is reinitialized for S2. In the preferred embodiment, S2=(T2/20 msec.). After reinitializing the ramp timer for S2, control passes to Step 526. If, on the other hand, the ramp time determination at Step 516, indicates that the ramp time involved with the gear change or shift event is not equal to S1, control passes to Step 522. At Step 522, the ramp timer is incremented and control is then passed to Step 526.

A new throttle component is calculated in Step 526. The new throttle component is equal to old throttle component plus one step. The total output to the Variable Pressure Solenoid 372 is then calculated in Step 528 and is equal to the new throttle plus a step. as mentioned above, the shift timer is incremented in Step 530. Control then passes to Step 532. At Step 532, and as mentioned above, the expired shift time involved with this particular gear shift or event is compared to a predetermined value equal to S1 plus S2. If the shift time involved with this particular gear shift or event is equal to S1 plus S2, control passes to Step 534 which indicates that the shift or gear change is over. When a determination is made at Step 534 that the shift event is over or completed, the output pressure or signal of the Variable Pressure Actuator or Solenoid 372 is brought to its full capacity by bringing the current to Solenoid 372 all the way down. If the shift time involved with this particular gear shift or event isi not equal to S1 plus S2, control passes to Step 536 and the program is run again.

The implications of this algorithm are that the torque component is not ramped every sample. It is set to the value as determined from the torque read during that sample. The throttle component is ramped up to its goal current change. This goal may change during each sample. Moreover, at the end of ramp AB, the output current to the actuator 372 will consist of the torque component plus the goal.

The Shift Quality Software Program 468 may also include a Jolt and Dither routine in a separate module 540 which receives the output of Calculation Module 492. The purpose of Module 540 is to improve the performance of actuator 372 by illiminating sticktion and friction. A filtered signal from the Gear Position Sensor 464 acts as a logic signal for aborting operation of actuator 32. The dither routine of Module 540 provides an AC signal which is superimposed on the command signal developed by the Calculation Module 492. The Jolt routine of Module 540 provides a short, high signal to the solenoid associated with actuator 372.

The operation of the transmission according to the present invention will now be described to insure a complete understanding thereof. The pump 100 provides fluid to the Regulator Valve 102 which regulates pressure in Line Pressure Circuit 123. An exemplary operation of the transmission in various P-R-N-D-3-2-1 positions of the Manual Valve 106 is as follows.

As may be best illustrated in FIG. 16, when the driver places the Manual Selector Valve 106 at the "P" or "N" range, regulated line pressure in Circuit 123 is blocked from coming out of any of the ports associated with Valve 106. Since the line pressure does not come out of these ports, the engaging elements including the clutches and bands associated with the transmission are deactivated because they are activated by the line pressure coming out of the ports of the Manual Valve 106. This renders the power train of the transmission in a neutral state.

When the driver shifts the Manual Valve into the "R" or reverse range wishing reverse travel, the spool 164, as seen in FIG. 16, is linearly shifted. As such, the regulated line pressure provided to port 166 of Valve 106 by the Line Pressure Circuit 123 will flow through the groove 173 of spool 164 and enters the Reverse Circuit 148 through port 165. The fluid in Reverse Circuit 148 flows in three separate directions. In one direction, fluid flows to port 128 of the Regulator Valve 102. As such, the fluid delivered to Valve 102 by the Reverse Circuit 148 compliments the other forces acting on spool 134 of Valve 102 in a manner increasing the pressure in the Line Pressure Circuit 123. When Manual Valve 106 is in Reverse position, fluid also flows to the large area cavity 91 of servo 71. The fluid flowing to cavity 91 ultimately applies the B2 Band. Moreover, fluid in the Reverse Circuit 148 is delivered to Clutch C3 whereby applying same. As mentioned above, application of Band B2 and Clutch C3 result in reverse rotation of the transmission output shaft 26. The increase in line pressure effected when the driver moves the shift lever 165 to the "R" or Reverse position provides engaging elements B2 and C3 with sufficient increased torque capacity required to effect reverse rotation of transmission output shaft 26.

When the driver or operator moves Valve 106 to its "D" or Drive position, spool 164 of Valve 106 is so disposed that the fluid delivered to port 166 of Valve 106 by the Line Pressure Circuit 123 is fluidically connected to port 167. As such, fluid is delivered to the Drive Circuit 175. When spool 164 of Valve 106 is disposed in Drive position, fluid is delivered in several directions. In one direction, fluid flows to the C2 Clutch in a manner applying same. At the same time, fluid flows through Drive Circuit 175 and is presented to port 232 of the 3/4 Shift Valve 122 and port 184 of the ½ Shift Valve 118.

When the vehicle is at a standstill with Manual Valve 106 placed at the "D" range, the Shift Schedule Software 466 of the ECU 450 causes the actuators 260, 222 of Valves 122 and 120, respectively, to be turned ON, causing the spools of each to assume the positions as illustrated in the top half thereof, respectively, as viewed in FIG. 8. Because actuators 260 and 222 are ON, the fluid delivered through the Supply Conduit 152 is blocked from entering ports 244 and 216, respectively. Concurrently, ports 244 and 216 exhaust through said actuators. As such, there is no force opposing the fluid delivered to ports 180, 210 and 230 of Valves 118, 120, and 122, respectiveley, by the Supply Circuit 152. Therefore, the spool 190 of the Shift Valve 118 moves to assume the position as illustrated in the top half thereof, as viewed in FIG. 8. With the spools of Valves 118, 120 and 122 so disposed, the fluid delivered to port 232 of Valve 122 through the Drive Circuit 175 is blocked by land 248 on spool 246. Likewise, the fluid delivered to port 184 of Valve 118 through the Drive Circuit 175 is blocked by land 194 of spool 190. Under such conditions, the electronic and hydraulic logic combine to cause the vehicle to move in a first forward speed ratio or condition as a result of Clutch C2 application and the action of the 1-2 one-way-clutch 63 operaton.

The vehicle will remain in the first forward speed ratio until signals provided to the ECU 450 by the various input sensors indicate a need for a 1-2 gear shift. That is, when the vehicle has reached the running state where a second speed ratio is to be established, as a result of increase in vehicle speed, the ECU 450 switches the state of actuator 260 associated with the ¾ Shift Valve 122 to an OFF state. As such, the output signal of the actuator 260 is applied against the spool 246 in a manner causing it to linearly shift such that it assumes the position as illustrated in the lower half thereof as illustrated in FIG. 8. With the actuator 260 switched OFF, fluid is permitted to flow from the Drive Circuit 175 to port 234 of Valve 122 across groove 249. From port 234 fluid flows into the Overrun Clutch Circuit 262 and, ultimately, applies clutch C4. With actuator 260 switched OFF, fluid from Supply Circuit 152 flows through the solenoid into port 244 and through conduit 270. Fluid flows through conduit 270 and enters conduit 208 which delivers same to port 189 of the ½ Shift Valve 118. Fluid so delivered to Valve 118 is applied against the exposed cross-section of land 200 causing the spool 190 to shift in a manner changing the hydraulic logic. When spool 190 shifts, the spool 190 assumes the position as illustrated by the lower half thereof as viewed in FIG. 8.

Moreover, during a 1-2 upshift, the solenoid associated with actuator 402 is turned ON and OFF at the beginning and end of the shift, respectively. Concurrently, Variable Pressure Solenoid 372 receives an electrical "current" signal from the ECU 450 of a magnitude and duration determined by the above softwre. Variable Pressure Solenoid 372 converts this "current" into an inversely proportion hydraulic pressure which is delivered to port 380 of the Band Apply Regular Valve 110 through the Variable Pressure Circuit 400. This aspect or feature accounts for the "commercial" reliability and redundancy of the system. When the solenoid associated with actuator 402 is OFF, it passes high pressure fluid to spool 382 of the Valve 110. When in the OFF position, the solenoid overrides any pressure signal from the Variable Pressure Solenoid 372. When the solenoid associated with actuator 402 is turned ON, however, the high pressure signal of the Solenoid Supply Circuit 152 is blocked from signaling the Regulator Valve and the output of the Variable Pressure Solenoid takes precedent to control the Regulator Valve.

As mentioned, the 1-2 shift is initiated by turning ON the solenoid associated with actuator 402 and sending the Variable Pressure Solenoid 372 through a low pressure ramp function. As such, the Band Regulator Valve 110 operating under the influence of the fluid pressure output of solenoid 372 acting against spring 383 delivers a proportionately low fluid pressure signal to band B1 causing a "smooth" shift. At the end of a programmable time period (approx. one second), the solenoid associated with actuator 402 is turned OFF concurrently with sending the Variable Pressure Solenoid to its maximum pressure value. As previously explained, turning the solenoid associated with actuator 402 OFF, allows high pressure to pass through the solenoid driving the spool 382 into a position as illustrated by the lower half thereof, as illustrated in FIG. 10.

With the ½ Shift Valve 118 and the Band Regulator Valve 110 having their spools 190, 382, respectively, shifted, the fluid in the Drive Circuit 175 passing to port 184 of the ½ Shift Valve 118 flows across annular grooves 195 of spool 190 into port 185. The fluid passed to port 185 of Valve 118 enters the 2nd Gear Circuit 204 and is delivered to port 374 of the Band Apply Regulator Valve 110. Because of the shifted disposition of spool 382, full line pressure is permitted to pass through annular groove 381 and enter port 376. From port 376, full line pressure is passed through the Band Apply Feed Circuit 202 to chamber 76 of the engaging element 69. This insures that the Band Apply Regulator Valve output to the band 69 is elevated sufficiently to discontinue Band B1 from slipping. From port 376 of Valve 110, full line pressure is also passed through the Band Apply Feed Circuit 202 to port 182 of the ½ Shift Valve 118 whereat it maintains the spool 190 in its displaced position as illustrated in the lower half thereof. If the solenoid associated with actuator 402 fails to switch the line pressure sigal to the spool 382 of the Valve 110, the Variable Pressure Solenoid 372 through its action against spring 383 accomplishes the same function by virtue of being sent to its maximum output pressure at completion of the shift event. Therefore, to burn up the engaging element, both actuator 402 and the Variable Pressure Solenoid 372 must concurrently fail. Statistically, this is very unlikely to happen: i.e., redundancy feature.

The transmission will remain in the second forward gear ratio until the input sensors relate to the ECU 450 that an automatic shift to another gear is in order. If the sensors import that a 2-1 gear shift is in order, the ECU will switch the solenoid actuator 402 associated with the Band Apply Regulator Valve 110 to ON concurrently with sending the Variable Pressure Solenoid 372 through a high-to-low pressure ramp function (ramp off or ramp down). Because the actuator 402 of Valve 110 has been switched ON, the variable pressure output of Solenoid 372 assumes control of the Band Apply Regular Valve 110 which, in turn, outputs a proportional high-to-low pressure ramp to the B1 piston 69. This gradual decrease in band apply preessure slips the B1 Band off in a manner achieving a first forward drive gear ratio condition. The 2-1 shift event is completed by concurrently: switching actuator 402 associated with Valve 110 OFF; switching actuator 260 of the ¾ Shift Valve 122 ON; and, sending the Variable Pressure Solenoid 372 to its maximum pressure value. By switching actuator 260 of the ¾ Shift Valve 122 ON, the spool 246 of the 3/4 Shift Valve 122 and spool 10 of the ½ Shift Valve 118 assume positions as shown in the upper halves thereof as illustrated in FIG. 8. Under such conditions, a burn-up of any friction element or unit during a 2-1 shift or event is only possible given the concurrent failures of actuators 401, 260, and 372. As one skilled in the art may appreciate, statistically this is unlikily to happen.

On the other hand, should the sensors import to the ECU 450 that a 2-3 gear shift is in order, the ECU 450: maintains the OFF state of the actuator 260 associated with the ¾ Shift Valve 122; switches or changes the state of actuator 222 associated with the ⅝ Shift Valve 120 to an OFF state; changes the state of actuator 402 associated with the Band Apply Regulator Valve 110 in a manner described below: and, maintains the OFF state of actuator 418 associated with the Clutch Apply Regulator Valve 112.

As mentioned above, with actuator 260 switched OFF, fluid is permitted to flow from the Drive Circuit 175 to port 234 of Valve 122 across groove 249. From port 234 fluid flows into the Overrun Clutch Circuit 262 and, ultimately, maintains the overruning clutch C4 actuated. Moreover, the actuation of actuator 260 allows Supply Circuit fluid to reach or be delivered to port 189 of ½ Shift Valve 118 through conduit 270. Fluid so delivered to Valve 118 will be applied against the larger cross sectional area of land 200 in a manner maintaining the current logic state of the ½ Shift Valve 118. As such, the spool 190 maintains the same position it had during a 1-2 shift. The position of spool 190 of Valve 118 during a 2-3 shift is illustrated by the position of the spool 190 in the lower half thereof as viewed in FIG. 8. Concurrently, Variable Pressure Solenoid 372 receives an electrical "current" signal from the ECU 450 of a magnitude and duration determined by the Shift Quality Program 468. Variable Pressure Solenoid converts this "current" into an inversely proportional pressure signal which controls the disposition of the spool 382 of Valve 110 and thereby regulates the flow of fluid from the 2nd Gear Circuit 204 to chamber 76 of piston 69.

As mentioned, when the input sensors import that a 2-3 shift is in order, the ECU 450 also switches or changes the state of actuator 222 associated with the ⅔ Shift Valve 120 to an OFF state. As such, the output signal of the actuator 222 is applied against the larger cross sectional area of land 224 causing spool 218 to linearly shift and assume the position as illustrated in the lower half thereof as viewed in FIG. 8. With actuator 222 switched OFF and the spool 218 of Valve 120 so disposed, fluid delivered to port 212 by the 2nd Gear Circuit 204 is permitted to pass through groove 221 and enter port 214. From port 214 fluid is passed into the 3rd Gear Circuit 150 and is delivered in several directions. In one direction, the fluid entering the 3rd Gear Circuit 150 flows to port 278 of the 4/3 Sequence Valve 124 (FIG. 9). Fluid in the 3rd Gear Circuit 150 is also presented to port 408 of the Clutch Apply Regulator Valve 112 (FIG. 10).

As mentioned, during a 2-3 shift or event the solenoid associated with actuator 418 remains OFF. As such, the solenoid associated with the Clutch Apply Regulator Valve 112 outputs a high pressure signal. As a result, spool 420 is linearly maintained in a position illustrated by the lower half thereof as viewed in FIG. 10. With the ½ Shift Valve 118 and the Clutch Apply Regulator Valve 112 having their spools 190, 420, respectively, shifted, fluid in the Drive Circuit 175 passing to port 184 of the ½ Shift Valve 118, crosses annular groove 195 and is delivered into port 185. The fluid passing to port 185 of Valve 118 enters the 2nd Gear Circuit 204 and, as mentioned above, is delivered in several directions. In one direction, fluid is delivered to port 374 of Valve 110. During a 2-3 shift or event however, actuator 402 associated with Valve 110 is switched from OFF to ON. As such, fluid from the Supply Conduit 152 is blocked from acting on spool 387. Fluid passing into the 2nd Gear Circuit 204 is simultaneously presented to port 212 and the ⅔ Shift Valve 120 and during a 2-3 shift, is permitted to pass port 214.

From port 214 of Valve 120, fluid flows in various directions through the 3rd Gear Circuit 150. In one direction fluid flows to port 278 of the 4/3 Sequence Valve 124 defining further hydraulic logic in the hydraulic valve body. In effect, and as will be understood by those skilled in the art, the 4/3 Sequence Valve 124 acts as a hydraulic connection between the B1 piston 69 and the C1 Clutch. The disposition of spool 282 of the 4/3 Sequence Valve 124, during a 2-3 shift or event is as shown in the top half of the spool as viewed in FIG. 9. With spool 282 so disposed, fluid in the 3rd Gear Circuit is blocked from entering the 4/3 Sequence Valve 124 by land 286 of spool 282. Fluid in the 3rd Gear Circuit 150 also flows in a direction leading to port 408 of the Clutch Apply Regulator Valve 112. As mentioned above, with the actuator 418 of Valve 112 turned OFF, spool 420 assumes the position as seen in the lower half thereof as viewed in FIG. 10. With spool 420 so disposed, fluid presented to port 408 flows across annular groove 425 of spool 420 to port 410 opening to the Clutch Apply Feed Circuit 288. From port 410, full line pressure is passed through the Clutch Apply Feed Circuit 288 to clutch C1 in a manner applying same.

From port 410 of Valve 112, full line pressure is also passed through the clutch Apply Feed Circuit 288 to port 274 of Valve 124 (FIG. 9). With the spool 420 of valve 124 shifted as shown in the upper half thereof as viewed in FIG. 9, full line pressure fluid presented to port 274 crosses groove 285 of spool 282 and is presented to port 276 which opens to the conduit 266. Conduit 266 delivers the full line pressure to port 240 of Valve 122 (FIG. 8). With spool 246 shifted in the manner described above, fluid delivered to port 240 of Valve 122 traverses groove 253 and enters port 242. Port 242 opens to the Band B1 Release Circuit 268.

Fluid introduced into the Release Circuit 268 travels in different directions. In one direction, fluid in the Release Circuit 268 flows to chamber 72 of piston 69. During a 2-3 shift, and as will be understood by those skilled in the art, the piston 69 acts as an "accumulator" having fluid flows to both chambers 72, 76 thereof. In other words, C1 clutch pressure is controlled by the Band Apply Regulator Valve 110 regulating fluid flow to chamber 76. With clutch C1 coming ON and Band B1 being released, the rotary gear elements in the gear train 21 controlled by clutch C1 and band B1 are conditioned to effect or establish the 3rd forward drive gear ratio. Having once established the 3rd forward drive gear ratio, the ECU 450 maintains the solenoid associated with actuator 402 of Valve 110 ON. In a second direction, the fluid introduced into the Release Circuit 268 is presented to port 280 Valve 124. The Band Release fluid introduced to port 280 in combination with action of spring 287 maintains Valve 124 in the disposition illustrated in the top half thereof as viewed in FIG. 9.

Moreover, full line pressure exiting port 410 of Valve 112 is presented to port 289 of Valve 126 (FIG. 9). The fluid presented to Valve 126, in combination with the action of spring 304, linearly shifts the spool 296 into a position as illustrated by the top half of the spool as viewed in FIG. 9. With the spool 296 of Valve 126 so disposed, fluid in the Supply Circuit 152, presented to port 290, traverses groove 291 and initially enters conduit 301. The opposite end of conduit 301 opens to the actuator 332 associated with the Converter Clutch Control Valve 116. As will be evident from an understanding of this disclosure, the lockup clutch 30, if so provided, cannot be engaged in other than the 3rd or 4th gear ratio because actuating fluid has not been supplied or provided to the electromagnetic actuator 332 which controls the operation of the lockup clutch 30 until clutch C1 is actuated or energized.

The transmission will remain in the third forward speed drive ratio until the input sensors relate to the ECU that an automatic shift to another gear is in order. If the sensors import that a 3-2 shift is in order, the ECU 450 will determine by virtue of vehicle speed what control approach to select. Typical 3-2 control strategy for band shifting transmissions is for the transmission to adopt either a Band Control or Clutch Control Strategy. It is also typical that high vehicular speed 3-2 down shifts or events using Clutch Control strategy are degraded in terms of shift quality. Similarly, low vehicular speed 3-2 downshifts or events are degraded in terms of shift quality when a Band Control Strategy is used. By virtue of the flexibility afforded by the Shift Feel Module 109 (FIG. 10) of the present invention and the control Algorithm which directs the ECU 450, both Band and Clutch Control strategies are employed to effect a quality 3-2 downshift. As such, the best aspects of both approaches are utilized by the present invention. With the instant invention, a "burn-up" of the friction element or unit involved during a 3-2 shift or event is only possible given concurrent failures of actuators 222, 402 or 418 and 372. As is readily apparent, statistically, this is very unlikely to happen.

If the sensors import that a 3-2 shift is in order, the ECU 450 will determine by virtue of vehicle speed what control approach to adopt or select. If the vehicle is moving below a programmable speed point or level, a C1 Clutch Control approach or strategy will be adopted to effect the downshift. If the vehicle is moving faster than that programmable speed point or level, a B1 Band Control Approach or strategy will be used to control the downshift. If a 3-2 downshift is desired at a low vehicle speed, such that clutch control strategy will be used, then ECU 450 will deliver an output to switch or change actuator 418 to ON concurrent with sending the Variable Pressure Solenoid 372 through a ramping function. The output profile for Solenid 372 results in the Clutch Apply Regulator Valve 112 outputting a proportionally high-to-low (ramping down) pressure to the Clutch Apply Feed Circuit 288 and to the Band B1 Release Circuit 268. By gradually reducing the fluid pressure in Circuits 288 and 268, the C1 Clutch is smoothly slipped OFF concurrent with smoothly applying the B1 Band to achieve a second forward gear ratio state. The shift event is then completed by changing the state of actuator 418 of Valve 112 to OFF concurrently with switching actuator 222 of the ⅔ Shift Valve 120 to ON. As will be understood, switching the state of actuator 222 will change the linear disposition of spool 218 of the ⅔ Shift Valve 120 to a position as illustrated in the upper half thereof as viewed in FIG. 8. Such movement of spool 218 opens the 3rd Gear Circuit 150 to exhaust port X8. Since actuator 418 is OFF, spool 420 of the Clutch Apply Regulator Valve 112 is held hard over as illustrated in the lower half thereof as seen in FIG. 10. Therefore, the Clutch Apply Feed Circuit 288 is fluidically connected to the 3rd Gear Circuit 150 through port 410 and 425 of Valve 112. As such, the Clutch Apply Feed Circuit 288 is likewise exhausted (pressure reduced to zero) through the exhaust port X8 in the ⅔ Shift Valve 120.

On the other hand, if a 3-2 gear shift or event is desired at high vehicle speed, that is, at a speed above a programmable speed point, then the ECU 450 has the flexibility of selecting a Band Control Strategy for effecting the downshift. When a Band Control Strategy is utilized to effect a downshift, ECU 450 outputs a control signal capable of switching or changing the present state of actuator 222 associated with the ⅔ Shift Valve 120 to ON. Concurrently, actuator 402, associated with the Band Apply Regulator Valve 110, is switched ON. Also, concurrently, the Variable Pressure Solenoid 372 is ramped up so as to gradually increase the output pressure thereof. Because actuator 402 of Valve 110 has been switched ON, the Band Apply Regulator Valve 110 outputs a pressure proportional to that of the Variable Pressure Solenoid 372 which, in turn, begins to apply piston 69 through fluid flowing to chamber 76 thereof. The displacement of piston 69 resulting from fluid flow to chamber 76, causes the fluid present in chamber 72 to forcibly flow backwards into the Band B1 Release Circuit 268. Since actuator 222 of the ⅔ Shift Valve 120 has been switched ON, spool 218 of Valve 120 is so disposed to open the 3rd Gear Circuit 150 to exhaust at port X8. Since the 3rd Gear Circuit 150 is fluidically connected to the Band B1 Release Circuit 268 by virtue of the Clutch Apply Regulator Valve 112, and since the Clutch Aply Feed Circuit 288 is fluidically connected to the Band B1 Release Circuit 268 by virtue of the conduit 266 and the positions of the ⅔ Shift Valve 122 and the 4/3 Sequnce Valve 1234, the C1 Clutch begins exhausting through exhaust port X8. As the application of piston 69 causes fluid to be forced out of chamber 2, fluid backpressure is built up against exhaust port X8 in the Band B1 Release Circuit 268 and the Clutch Apply Feed Circuit 288. This backpressure maintains torque capacity in the C1 Clutch until piston 69 has the B1 Band fuly applied in a manner establishing 2nd forward gear drive ratio.

On the other hand, should the sensors import to the ECU 450 that a 3-4 shift or event is in order, the ECU 450 maintains the OFF state of the actuator 222 associated with the ⅔ Shift Valve 120; switches or changes the state of the actuator 260 associated with the 3/4 Shift Valve 122; maintains the state of actuator 418 associated with the Clutch Apply Regulator Valve 112; and, changes the state of actuator 402 associated with the Band Apply Regulator Valve 112 in a manner described in detail below.

By maintaining the OFF state of actuator 222 associated with the ⅔ Shift Valve 120, fluid from the Solenoid Supply Circuit 152 is permitted to flow into conduit 226 through port 216 of Valve 120. Ultimately, the fluid flowing through conduit 226 is presented to port 189 of the ½ Shift Valve 118. Fluid so delivered to Valve 118 will be applied against the larger cross sectional area of land 200 in a manner maintaining the current logic state of the ½ Shift Valve 118. As such, spool 190 maintains the same position it had during a 12 and 2-3 shift. The position of spool 190 during a 3-4 shift is illustrated by the position of the spool 190 in the lower half thereof as viewed in FIG. 8. With spool 190 so disposed, Drive Line Circuit fluid ultimately flows to port 374 of the Band Apply Regulator Valve 110 and to port 212 of Valve 120.

As mentioned, during a 3-4 gear shift or event, ECU 450 changes the state of solenoid associated with actuator 260 of Valve 122 from OFF to ON. As such, the fluid flowing to the solenoid associated with actuator 260 by the Supply Conduit 152 is blocked and port 244 is exhausted through the solenoid. With actuator 260 ON, the fluid forces acting on spool 246 of Valve 122 linearly shifts the spool 246 into a position as illustrated by the top half thereof as viewed in FIG. 8. With spool 246 of Valve 122 so disposed, fluid flowing to port 232 of Valve 122 through the Drive Line Circuit 175 is blocked by land 248 of spool 246. Moreover, with spool 246 of Valve 122 so shifted: Overrun Circuit 262 is open to exhaust port X10 in a manner releasing the overrunning clutch C4 in the 4th forward speed drive ratio; and, the Band Release Circuit 268 is open to exhaust port X11 allowing the band B1 to be applied.

Moreover, during a 3-4 upshift, the solenoid associated with actuator 402 of Valve 110 is turned ON and OFF at the beginning and end of the shift, respectively. Concurrently, the Variable Pressure Solenoid 372 receives an electrical "Current signal from the ECU 450 of a magnitude and duration determined by the Shift Quality Softwre. Solenoid 372 converts this current into an inversely proportional hydraulic pressure signal which is delivered to port 380 of Valve 110 through the Variable Pressure Circuit. As mentioned above, when the solenoid associated with actuator 402 of Valve 110 is turned ON, the fluid in the Solenoid Supply Circuit 152 is blocked from signaling the Regulator Valve 110 and the output of the Variable Pressure Solenoid 372 takes precedent to control the Valve 110. By sending the Variable Pressure solenoid through a low pressure ramp function and with the solenoid associated with actuator 402 turned ON, the Band Regulator Valve 110 delivers a proportionately low fluid pressure signal to band B1 in a manner engaging band B1 causing a "smooth" shift. At the end of a programmable time period, the solenoid associated with actuator 402 of Valve 110 is switched OFF concurrently with sending the Variable Pressure Solenoid 372 to its maximum pressure value. As previously explained, by turning the solenoid associated with actuator 402 OFF, high pressure is allowed to pass through the solenoid in a manner driving spool 382 into a position as illustrated by the lower half thereof as illustrated in FIG. 10.

With spool 382 of Valve 110 so shifted, the fluid flowing to port 374 of Valve 110 through the 2nd Gear Circuit 204 is permitted to pass through annular groove 382 and enter port 376. From port 376, fluid flows into and through the Band Apply Feed Circuit 202 and, ultimately, to chamber 76 of engaging element 69. This insures that the output of Valve 110 to band 69 is elevated sufficiently to discontinue band B1 from slipping. From port 376 of Valve 110, fluid is also passed through the Band Apply Feed Circuit 202 to port 182 of the ½ Shift Valve 118 in a manner maintaining the spool 190 in its displaced position as illustrated in the lower half thereof as viewed in FIG. 8. If the solenoid associated with actuator 402 fails to switch the line pressure signal to spool 382 of Valve 110, the Variable Pressure Solenoid 372 accomplishes the same function by virtue of being sent to its maximum output pressure upon completion of the shift event.

Besides flowing to the Band Apply Regulator Valve 110, the shifted stat of spool 190 of Valve 118 permits Drive Circuit fluid to flow from port 184, across groove 195, and into port 185 from whence it flows to port 212 of Valve 120. Because actuator 222 maintains an OFF state during a 3-4 shift event, spool 218 of Valve 120 allows fluid presented to port 212 to flow across annular groove 221 and enter port 214. From port 2124 fluid flows into the 3rd Gear Circuit 150.

As mentioned earlier, fluid flowing into the 3rd Gear Circuit 150 travels in several directions. In one direction, fluid flowing through the 3rd Gear Circuit 150 is presented to port 408 of the Clutch Apply Regulator Valve 112 (FIG. 10). During a 3-4 shift or event, the actuator 418 is maintained OFF. As such, the actuator 418 permits high pressure fluid to be applied against spool 420 in a manner maintaining the spool 420 in a position as illustrated in the lower portion thereof as viewed in FIG. 10. With spool 420 of Valve 112 so disposed, the fluid presented to port 408 of Valve 112 cross annular groove 425 and enter the Clutch Apply Feed Circuit 288 through port 410. The fluid passing through the Clutch Apply Feed Circuit 288 passes to the C1 clutch in a manner maintaining the C1 clutch applied. With engaging element 69 energized in a manner applying the B1 band and with the C1 clutch applied, the rotary gear elements in the gear train 21 controlled by clutch C1 and band B1 are conditioned to effect the 4th forward drive gear ratio Fluid in the 3rd Gear Circuit also flows to port 278 of Valve 124 (FIG. 9). As seen in FIG. 9, besides engaging or maintaining the engagement of the C1 clutch, fluid flow in the Clutch Apply Feed Circuit 288 is also presented to port 272 of Valve 124. The fluid forces acting on spool 282 of Valve 124 causes it to linearly shift as shown by the lower half thereof as viewed in FIG. 9 and in a manner changing the hydraulic logic of the present invention in the 4th forward gear drive ratio. That is, with Valve 124 shifted in the 4th forward gear ratio, the fluid connection between band B1 and Clutch C1 is eviscerated. With spool 282 so disposed, the fluids in the 3rd Gear Circuit 150, presented to port 278, cross groove 285 and are presented to port 276. From port 276 fluid passes through conduit 266 to port 240 of Valve 122 (FIG. 8). At port 240 of Valve 122 fluid is prevented from entering because of the present disposition of land 252 provided on spool 246. Moreover, with spool 246 of Valve 122 so disposed, the Band B1 Release Circuit 268 is open to exhaust port X11. As such, chamber 72 of piston 69 may be exhausted along with those fluids presented to one end of Valve 124 are likewise exhausted through port X10. The shifted state of spool 246 also permits communication between ports 236 and 238 of Valve 122. As such, and as will be readily understood, fluids in the Band Apply Feed Circut 202 are, ultimately, passed to chamber 77 of piston 69 to add to the engaging action of element B1.

Additionally, Clutch Apply Feed Circuit 288 fluid is. also presented to port 289 of Valve 126. During the 4th forward drive speed ratio, these fluids along with the concomitant action of spring 304 maintain spool 296 of Valve 126 linearly shifted as illustrated in the top half thereof as viewed in FIG. 9. With spool member 296 so shifted, fluids in the Solenoid Supply Conduit 152 cross groove 291, are presented to port 292 and pass through conduit 301 to the solenoid associated with actuator 332. As mentioned earlier, the fluids presented to actuator 332 permit operation of the lockup clutch 30 in the third and fourth forward drive gear ratios.

The transmission will remain in the fourth forward speed drive ratio until the input sensors import to the ECU 450 that an automatic shift to another gear is in order. If the sensors import or relate that a 4-3 gear shift or event is in order, the ECU will switch solenoid 402 of Valve 110 ON. Concurrently, the Variable Pressure Solenoid 372 will be sent through a high-to-low ramping function. Because actuator 402 of Valve 110 is switched ON, the Variable Pressure Solenoid fluid pressure, which is present in the Variable Pressure Circuit 400, assumes control of the Band Apply Regulator Valve 110. As such, the Regulator Valve 110 outputs a proportioally high-to-low pressre profile to the Band Apply Feed Circuit 202. The pressure in Circuit 202, which is also present in chambers 76 and 77 of piston 69, smoothly slips the B1 Band OFF by virtue of it being ramped down. The 4-3 shift event is completed by the ECU concurrently: switching OFF actuator 260 of the ¾ Shift Valve 122; switching OFF actuator 402 associated with the Band Apply Regulator Valve 110; and, sending Variable Pressure Solenoid 372 to its maximum pressure value. As with the other shift events, a burn-up of a friction element or unit involved with a 4-3 shift can occur only if actuator 260, 402 and the Variable Pressure Solenoid 372 fail. Statistically, as with the other shifts, this is unlikely to happen.

Switching OFF actuator 260 of the ¾ Shift Value 122 during a 4-3 downshift causes spool 246 of Valve 122 (FIG. 8) to linearly shift into a position as illustrated in the lower half thereof as viewed in FIG. 8. In this position, spool 246 allows conduit 266 to fluidically communicate with the Band B1 Release Circuit 268 through ports 240 and 242 of the ¾ Shift Valve 122 (FIG. 8). Spool 282 of the 4/3 Sequence Valve 124 when disposed as illustrated in the lower half thereof as viewed in FIG. 9, allows the 3rd Gear Circuit 150 to fluidically communicate with conduit 266. As such, conduit 266 receives fluid from the 3rd Gear Circuit 150 which fluid, in turn, is delivered to the Band B1 Release Circuit 268 through the ¾ Shift Valve 122. The fluid in the Release Circuit 268 flows in two directions. In one direction, fluid in the Release Circuit 268 flows to port 280 of the 4/3 Sequence Valve 124 to act as an input signal. In another direction, fluid in the Release Circuit 268 flows to chamber 72 of servo piston 69. The fluid pressure in the Release Circuit 268 hydraulically displaces piston 75 to lock the servo piston 69 in an OFF position as illustrated in FIG. 3. As piston 75 is displaced to its maximum limit, the fluid pressure in the Release Circuit 268 rises to a level or value approaching the pressure in the Clutch Apply Feed Circuit 288. As illustrated in FIG. 9, the Clutch Apply Feed Circuit 288 opens to ports 272 and 274 of the 4/3 Sequence Valve 124. As the pressure in the Release Circuit 268 approaches the pressure level or value in the Clutch Apply Circuit 288, spring 287 shifts spool 282 of Valve 124 into a position as shown by the upper half thereof as viewed in FIG. 9. With spool 282 of Valve 124 so disposed, the Clutch Apply Feed Circuit 288 fluidically communicates with conduit 266. Conduit 266 delivers the Clutch Apply Feed Circuit fluid to the Band B1 Release Circuit 268 through the ¾ Shift Valve 122. The fluidic connection of the Clutch Apply Feed Circuit 288 with the Release Circuit 268 enables any subsequent 3/2 downshift to also be effected. Moreover, the fluidic connection of the Clutch Apply Feed Circuit 288 with the Release Circuit 268 prior to disengagement of servo piston 69 would result in a pressure drop in the Clutch Apply Feed Orifice 600, shown in FIG. 10, and flow demand caused by disengaging servo piston 69. Such a pressure drop in the Clutch Apply Feed Circuit 288 could induce slippage of the C1 Clutch. This is understandably undesirable. Hence, the logic and purpose of the 4/3 Sequence Valve can be readily understood. The logic and purpose of the 4/3 Sequence Valve being to hydraulically stroke servo piston 69 OFF without having a pressure drop in the Clutch Apply Release Circuit 288.

From the above, a person skilled in the art will readily appreciate that both upshift and downshift events are controlled by positioning the Shift Valves 118, 120 and 122 through use of the actuators 222 and 260 in combination with driving the band and/or Clutch Apply Regulator Valves 110, 112, respectively, with Variable Pressure Solenoid 372 by virtue of actuators 402, 418. Positioning the Shift Valves serves to either energize or exhaust the "feed pressure" to the Band and Clutch Regulator Valves. Turning ON actuators 402 and 418 allows the Variable Pressure Solenoid 372 to control the Band and Clutch Regulator Valves 110, 112, respectively, thereby outputting a proportional pressure to the B1 Band and C1 Clutch, respectively. Turning OFF actuators 402, 418 allows the high pressure in the Solenoid Supply Circuit 152 to signal the Band and Clutch Regulator Valves 110, 112, respectively, to output a proportionally high pressure to the associated band and clutch. In a redundant manner preventing burn-up of the friction units, the Variable Pressure Solenoid 372 is sent to its maximum pressure value at the end of a shift event to provide the same function.

The lock-up clutch operation will now be discussed in detail. Fluid exiting port 131 of Regulator Valve 102 enters the converter Clutch Feed Circuit 125. As seen in FIG. 7, fluid the Feed Circuit 125 is presented to port 310 of the Converter Clutch Control Valve 116. As mentioned, the linear disposition of spool 320 of the Valve 116 is influenced by the fluid forces acting thereon. The fluid in the Solenoid Supply Conduit 152 operates against one end of the spool 320 in a manner applying a shifting impetus thereto. The output signal to actuator 332 tends to urge the spool 320 of Valve 116 in an opposite direction. When the solenoid associated with actuator 332 is OFF, the fluids in the Supply Conduit 152 urge the spool 320 into a position as illustrated in the upper half of the spool as viewed in FIG. 7. With spool 320 of Valve 116 so disposed, fluid in the Converter Feed Circuit 125 presented to port 310 of Valve 116 traverses annular groove 323 and is presented to port 308. From port 308 of Valve 116 fluid are ultimately delivered to the release chamber 33 of the lockup clutch 30 in a manner maintaining clutch 39 inoperative.

Besides providing a shifting impetus to spool 320 of Valve 116, Solenoid Supply Conduit fluids flow through the axial bore 321 of the spool 320 and exit the radially intersecting port 319. The fluids exiting port 319 of Valve 116 enter the fluid conduit 346 and are, ultimately transmitted to port 354 of the Converter Clutch Regulator Valve 114.

As with the other Valves disposed throughout the hydraulic valve body of the present invention, spool 356 of Valve 114 is linearly disposed as a function of the fluid forces acting thereon. With Valve 114 so disposed, the variable pressure output signal of Variable Pressure Solenoid 372 is applied to one end of spool 356. By multiplexing the output of the Variable Pessure Solenoid 372 to Valve 114, the linear position of the spool 356 is controlled in a manner effecting a "smooth" or quality actuation of the lock-up clutch 30. When the output of Solenoid 372 is sufficiently raised, spool 356 of Valve 114 assumes a linear position as illustrated in the upper half thereof as viewed in FIG. 7. With spool 356 of Valve 114 so disposed, the fluid presented to port 354 croses annular groove 359 and enters port 352. From port 352 of Valve 114 fluid flows into the Regulator Apply Feed Circuit 344 and, ultimately, to port 316 of Valve 116. When actuator 332 is OFF, land 328 on spool 320 of Valve 116 prevents or blocks further flow of fluid to the lock-up clutch 30.

When the solenoid associated with actuator 332 changes state from OFF to ON, fluid from conduit 301 is permitted to pass to the end of spool 320 in a manner shifting or changing the linear disposition of spool 320. Despite the shifted state of spool 320, Supply Conduit fluid continues to flow through the axial bore 321, radial port 319, into conduit 346 across spool 356 of Valve 114 and is presented to port 316. Because of the shifted state of spool 320 of Valve 116 the fluid now presented to port 316 flows across grooves 327 and is presented to port 314. From port 314 fluid is applied to actuation chamber 31 of the lockup clutch 30. Moreover, the shifted state of spool 320 places the release chamber 33 of lock-up clutch 30 in communication with exhaust port X16. The shifted state of spool 320 of Valve 116 also permits port 310 to communicate with port 312 across groove 325. As such when spool 320 is disposed as viewed in the lower half of FIG. 7, the Converter Feed Circuit 125 delivers fluid to the cooler apparatus 340. The lock-up clutch will remain engaged until actuator 332 again changes state. As mentioned above, the lockup state of clutch 30 is controlled by the Shift Schedule Software 466 and, more particularly, the Solenoid Controller 486. When actuator 332 changes state, the output fluid pressure signal from actuator 332 is removed from the end of spool 320 and the fluid forces acting on the opposite end thereof causes spool 320 to return to the other position. When in its other position, release chamber 33 is activated and the clutch 30 is released.

The gear shift events described thusfar have been described as sequenced or single step gear shifts (e.g. 1-2, 2-3 , 3-4, 4-3, 3-2, and 2-1). It is very desirable, however, for the transmission to have the capability of also making smooth "SKIPSHIFTS" in order for transmission response characteristics to satisfy the desires of the customer. Because of the flexibility afforded by the unique control system of the present invention, "Skip-Shifts" are easily obtainable. With the present invention "SKIP-SHIFTS" (1-3, 1-4, 2-4, 4-2, 4-1, and 3-1 shifts) are accomplished in exactly the same manner as sequenced shifts. It is by virtue of the flexibility afforded by the Shift Feel Module 109 and the control algorithms which direct the ECU 450 that all shift events, sequenced or skip, can be accomplished smoothly and quickly while maintaining adequate "redundancy" or "fail safe" characteristics for commercial application and reliability. For purposes of succinctness and clarity only the change in actuator operational states will be described to summarize the methodology for accomplishing "skip-shifts."

Initiation of a 1-3 skip-shift may be effected by concurrently: switching OFF actuators 260, 222 associated with the $\frac{3}{4}$ and $\frac{2}{3}$ Shift Valves 122, 120 respectively; switching ON actuators 402, 418 associated with the Clutch and Band Apply Regulator Valves 112, 110, respectively; and, ramping up the Variable Pressure Solenoid 372. Completion of a 1-3 skip-shift may be effected by concurrently: switching OFF actuators 402, 418 associated with the Band and Clutch Apply Regulator Valves 110, 112 respectively; and, sending the Variable Pressure Solenoid 372 to its maximum pressure value.

Initiation of a 1-4 skip-shift may be effected by concurrently: switching OFF actuator 222 associated with the $\frac{2}{3}$ Shift Valve 120; switching ON actuators 402, 418 associated with the Band and Clutch Apply Regulator Valves 110, 112, respectively; and ramping up the Variable Pressure Solenoid 372. Completion of a 1-4 skip-shift may be effected by concurrently: switching OFF actuators 402, 418 associated with the Band and Clutch Apply Regulator Valves 110, 112, respectively; and, sending the Variable Pressure Solenoid 372 to its maximum pressure value.

Initation of a 2-4 skip-shift may be effected by concurrently: switching OFF actuator 222 associated with the $\frac{2}{3}$ Shift Valve 120; switching ON actuator 260 associated with the $\frac{3}{4}$ Shift Valve 122; switching ON actuator 418 associated with the Clutch Apply Regulator Valve 112; and, ramping-up the Variable Pressure Solenoid 372. Completion of a 2-4 skip-shift may be effected by concurrently: switching OFF actuator 418 associated with the Clutch Apply Regulator Valve 112; and, sending the Variable Pressure Solenoid 372 to its maximum pressure value.

A 4-2 skip-shift may be initiated by concurrently: switching ON actuator 418 associated with the Clutch Apply Regulator Valve 112; and, ramping-down the Variable Pressure Solenoid 372. Completion of a 4-2 skip-shift may be effected by concurrently: switching OFF actuator 260 associated with the $\frac{3}{4}$ Shift Valve 122; switching ON actuator 222 associated with the $\frac{2}{3}$ Shift Valve 120; switching OFF actuator 418 associated with the Clutch Apply Regulator Valve 112; and, sending the Variable Pressure Solenoid 372 to its maximum pressure value.

A 4-1 skip-shift may be initiated by concurrently: switching ON actuator 402 associated with the Band Apply Regulator Valve 110; switching ON actuator 418 associated with the Clutch Apply Regulator Valve 112; and, ramping-down the Variable Pressure Solenoid 372. Completion of a 4-1 skip-shift may be effected by concurrently: switching ON actuator 222 associated with the $\frac{2}{3}$ Shift Valve 120; switching OFF actuators 402, 418 associated with the Band and Clutch Apply Regulator Valves 110, 112, respectively; and, sending the Variable Pressure Solenoid to its maximum pressure level or value.

Initiation of a 3-1 skip-shift is initiated by concurrently: switching ON actuator 402 associated with the Band Apply Regulator Valve 110; switching ON actuator 418 associated with the Clutch Apply Regulator Valve 112; and, ramping-down the Variable Pressure Solenoid 372. Completion of a 3-1 skip-shift is effected by concurrently: switching ON actuators 260, 222 associated with the $\frac{3}{4}$ and $\frac{2}{3}$ Shift Valves 122, 120, respectively; switching OFF actuators 402, 418 associated with the Band and Clutch Apply Regulator Valves 110, 112, respectively; and, sending the Variable Pressure Solenoid 372 to its maximum pressure level or value.

Should the operator move the Manual Valve 106 to either the "3" or "2" position (FIG. 16), the Drive Circuit 175 will remain effective as described above. That is, the transmission will operate in the same manner as described above but will be limited in upshift capability. As discussed above, should the operator move the Manual Valve 106 to the "3" position, the transmission will operate through the 1-2, 2-1, 1-3, 3-1, 2-3 and 3-2 gear shift ranges in the same manner as if the "D" or Drive position has been chosen. Because of the input from sensor 464, the ECU 450 will not permit any upshift to the fourth forward speed drive ratio. Similarly, should the operator move Manual Valve 106 to the "2" position the transmission will be limited in its operation to 12 and 2-1 gear shifts. Again, input sensor 464 signals to the ECU 450 to inhibit transmission operation in a gear range above the second forward drive speed ratio when the operator selects "2" on the Manual Valve 106.

As may be best illustrated in FIG. 16, when the operator moves Manual Valve 106 to the "1" or "Low" position, the regulated line pressure delivered to port 166 of Valve 106 flows across grooves 173 of spool 164 between lands 172 and 174 and exits ports 167 and 169 of Valve 106. From port 167, the regulated line pressure fluid flows into the Drive Circuit 175 and, ultimately, to the clutch C2 in a manner applying same. When Manual Valve 106 is disposed in a "1" or "Low" position the solenoids associated with actuator 260 of the ¾ Shift Valve 122 and actuator 222 associated with the ½ Shift Valve 120 are both ON. As such, the vehicle is prevented from upshifting. Moreover, the spools 246 and 218 of Valves 122 and 120, respectively, are disposed as illustrated in the upper half thereof as viewed in FIG. 8. With Valve 120 and 122 ON, the hydraulic forces on the ½ Shift Valve 118 causes the spool 190 thereof to linearly assume the position as illustrated in the upper half thereof as viewed in FIG. 8. With spool 190 of Valve 118 so disposed fluids in the Drive Line Circuit 175 are blocked at port 184 of Valve 118 by land 194. Moreover, with spool 246 of Valve 122 so disposed fluids in the Drive Line Circuit 175 are blocked at port 232 by land 248 on spool 246.

As mentioned above, with the Manual Valve 106 in the "1" or "Low" position, regulated line pressure is also delivered to port 169 of Valve 106. From port 169, the fluid enters the Lo Circuit 177. As may be best illustrated in FIG. 8, at the opposite end from port 170, Lo Circuit 177 opens to port 188 of the ½ Shift Valve 118. With Valve 118 being linearly shifted to the right, as seen in FIG. 8, under the influence of pressure being supplied to one end of Valve 118 by the Supply Conduit 152, fluid traverses from port 188 across groove 197 and enters port 186. From port 186 fluid flows into the Lo-1st Circuit 206. The Lo-1st Circuit 206 serves to direct fluid to chamber 91 of servo 71 whereby displacing piston 88 and thus applying Band B2. The Lo-1st Circuit, as illustrated in FIG. 9, also directs fluid to clutch C4 in a manner applying same. From the above, it is understood that when Manual Valve 106 is initially moved to either "1" or "Low" position, clutches C2 and C4 and band B2 are applied. As described above, when clutches C2 and C4 and band B2 are applied the transmission mechanism will operate in the first forward gear ratio. When the operator selects "D" or drive position, the free wheel 63 is normally operative to attain the first forward gear ratio operating conditions. In contrast, when the operator selects to operate the transmission in either "1" or "Low" position, band B2 is used to attain the first forward gear ratio operating conditions.

Thus, there has been provided an ELECTRO/HYDRAULIC CONTROL SYSTEM FOR AN AUTOMATIC TRANSMISSION which fully satisfies the objects, aims and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

Thus, having adequately described our invention, what we claim is:

1. An automatic transmission for a vehicle having an engine capable of producing torque, said transmission including gear elements capable of developing at least two different gear ratios between an input member and an output member, a first fluidically actuatable friction unit operable in combination with said gear elements for establishing a first gear ratio, a second fluidically actuatable friction unit operable in combination with said gear elements for establishing a second gear ratio, and an electrohydraulic control system for said automatic transmission comprising:

means for generating an actuating fluid pressure deliverable through separate fluidic circuits to said first and second friction units;

first shift valve means disposed in a fluidic circuit leading to said first fluidicially actuatable friction unit;

second shift valve means disposed in a fluidic circuit leading to said second fluidically actuatable friction unit;

first regulator means shiftable between two operable states in response to electrical signals being delivered thereto and arranged in combination with said first shift valve means for controlling fluid flow to said first fluidically actuatable friction unit as a function of the operable state of said regulator means;

second regulator means shiftable between two operable states in response to electrical signals being delivered thereto and arranged in combination with said second shift valve means for controlling fluid flow to said second fluidically actuatable friction unit as a function of the operable state of said regulator means;

at least one variable pressure solenoid whose variable pressure output is multiplexed to said first and second regulator means in a manner influencing the operable state of said first and second regulator means; and electronic control means for converting input signals thereto relating to operating conditions of said transmission into output signals in accordance with a predetermined set of criteria and for providing shift quality between gear ratios by selectively operating said regulator valves such that a programmably profiled fluid output from said variable pressure solenoid is delivered to an on-coming friction unit to effect a smooth transition between gear ratios and then full actuating fluid pressure is delivered to the on-coming friction unit by either maximizing the pressure output of the variable pressure solenoid or changing the present state of the respective regulator valve to allow full actuating fluid pressure to pass to the respective friction unit.

2. The control system according to claim 1 wherein said means for generating an actuating fluid pressure includes a pump driven with the input member to the transmission.

3. The control system according to claim 1 wherein said first shift valve means includes a linearly displacable member whose position is influenced by fluid forces acting thereagainst.

4. The control system according to claim 3 wherein said first shift valve means further includes actuator means for delivering a fluid output which acts against said member in response to an output from said electronic control means.

5. The control system according to claim 4 wherein said actuator means includes an ON/OFF solenoid arranged in combination with a fluid pressure supply source.

6. The control system according to claim 1 wherein said second shift valve means includes a linearly displacable member whose position is influenced by fluid forces acting thereagainst.

7. The control system according to claim 6 wherein said second shift valve means includes actuator means for delivering a fluid output which acts against said member in response to an output signal from said electronic control means.

8. The control system according to claim 7 wherein said actuator means includes an ON/OFF solenoid arranged in combination with a fluid pressure supply source.

9. The control system according to claim 1 wherein the electronic control means includes a micro-computer processed with a program for profiling the fluid output of said variable pressure solenoid according to the steps of:
(a) setting a predetermined and initial output presure for said variable pressure solenoid as a function of present engine torque;
(b) setting a shifttime over which the shift is to be effected;
(c) determining the amount of shift time expired since a shift initiation signal has been delivered from the electronic control means;
(d) setting a goal which is to be achieved by the variable pressure solenoid over the shifttime;
(e) determing whether the shifttime has expired;
(f) if NO at (e) incrementing the output pressure of the variable pressure solenoid in a predetermined stepped manner;
(g) determining whether the shifttime has expired;
(h) if NO at (g), repeat steps (f) and (g).

10. The control system according to claim 9 wherein the program for profiling the output of said variable pressure solenoid includes a further step of:
(i) if YES at (g), maximizing the pressure output of the variable pressure solenoid and changing the present state of the respective electrically energizable regulator valve.

11. The control system according to claim 1 wherein said electronic control means responds to mode selecting manual switch means for selecting one of several operating modes having different shift zones.

12. The control system according to claim 1 wherein said first regulator valve means includes actuator means for delivering a fluid output in response to output signals from said electronic control means.

13. The control system of claim 12 wherein said actuator means includes ON/OFF solenoid means having a source of fluid arranged in combination therewith.

14. A control system for an automatic transmission for a vehicle having an engine capable of producing torque, said transmission having an input shaft and an output shaft with multiple ratio gearing having a plurality of rotary elements connected to and between said shafts, hydraulic clutch means for controlling the rotational motion of some of said rotary elements, and brake means for controlling the rotational motion of other of said rotary elements, the control system comprising:
a source of operating fluid;
first fluid passage means for supplying operating fluid to said clutch means for engaging said clutch means;
second fluid passage means for supplying operating fluid to said brake means for engaging said brake means;
first shiftable valve means disposed in said first fluid passage means for controlling fluid flow to said clutch means in a manner effecting transmission output;
second shiftable valve means disposed in said second fluid passage for controlling fluid flow to said brake means in a manner effecting transmission output;
a two state clutch regulator valve means disposed in combination with said first shiftable valve means for controlling fluid flow to said clutch means;
a two state band regulator valve means disposed in combination with said second shiftable valve means for controlling fluid flow to said brake means;
at least one variable pressure solenoid whose variable pressure fluid output is multiplexed to both regulator valve means and is a profiled function of a program; and
electronic control means for converting input signals thereto relating to operating conditions of said transmission into output signals in a preprogrammed manner, said output signals controlling said profile program, the operational states of said regulator valve means, and the position of said shift valves in a manner effecting a smooth transition between gear ratios and causing a redundancy in operation of said regulator valve means to prevent damage to either the clutch means or brake means.

15. The control system of claim 14 wherein said source of operating fluid includes a fluid pressure producing source driven by said input shaft.

16. The control system of claim 15 wherein fluid pressure produced by said source is governed by a selectively controlled valve.

17. The control system of claim 14 wherein said first valve means includes a linearly displacable member whose position is influenced by fluid forces acting thereagainst.

18. The control system of claim 17 wherein said first valve means further includes actuator means for delivering a fluid output against said member in response to an output from said electronic control means.

19. The control system of claim 18 wherein said actuator means includes an ON/OFF solenoid arranged in combination with a fluid pressure supply source.

20. The control system of claim 19 wherein said fluid pressure supply source includes means for presetting the fluid pressure provided to said supply source.

21. The control system of claim 14 wherein said second valve means includes a linearly displacable member whose position is influenced by fluid forces acting thereagainst.

22. The control system of claim 21 wherein said second valve means further includes actuator means for delivering a fluid output against said member in response to an output signal from said electronic control means.

23. The control system of claim 22 wherein said actuator means includes an ON/OFF solenoid arranged in combination with a fluid pressure supply source.

24. The control system of claim 14 wherein said electronic control means includes a micro-computer processed with the profile program, said profile program including the steps of:
(a) setting a predetermined initial output pressure for said variable pressure solenoid based on present engine torque;
(b) setting a time over which the shift is to be effected;
(c) continually determining time expired since a shift initiation signal has been delivered from the electronic control means;
(d) having a goal which is to be achieved by the variable pressure solenoid over the time;
(e) determining whether the time necessary for effecting a shift has expired;
(f) if NO at (e), stepwise incrementing the output pressure of the variable pressure solenoid;
(g) determining whether the time necessary for effecting the shift has expired; and
(h) if NO at (g), repeat steps (f) and (g).

25. The control system according to claim 24 wherein the profile program includes a further step of:
(i) if YES at (g), maximizing the pressure fluid output of the variable pressure solenoid.

26. The control system of claim 24 wherein the goal set in step (d) may be accomplished by profiling the output pressure of said variable pressure solenoid over two discrete periods.

27. The control system of claim 26 wherein said two periods are individually programmable timewise.

28. The control system of claim 14 wherein said two state clutch regulator valve means includes a linearly shiftable member whose position is influenced by the fluid forces acting thereon.

29. The control system of claim 28 wherein said clutch regulator means further includes actuator means for delivering a fluid pressure output which acts against said member.

30. The control system of claim 14 wherein said two state band regulator valve means includes a linearly shiftable member whose position is influenced by the fluid forces acting thereon.

31. The control system of claim 30 wherein said band regulator valve means further includes an actuator capable of producing a fluid pressure output which acts against said member.

32. A control system for an automatic transmission for a vehicle having an engine capable of producing torque, said transmission having an input shaft and an output shaft with multiple ratio gearing including a plurality of rotary elements connected to and between said input shaft to said engine, a first clutch means for controlling the relative motion of some of the elements of said gearing to establish a first gear ratio, band means for controlling the relative motion of some other elements of said gearing and which combines with said first clutch means to establish and disestablish ratio changes between the first gear ratio and a second gear ratio, and a second clutch means arranged in combination with said band means for controlling the relative rotation of still other gearing elements to establish and disestablish gear ratio changes between second and third gear ratios, said control system comprising:
a source of operating fluid;
conduit structure individually connecting said source of operating fluid to each of said clutch and band means;
12 shift valve means for selectively controlling the distribution of operating fluid through said conduit structure as a function of its linear disposition;
2-3 shift valve means for selectively controlling the distribution of operating fluid through said conduit structure as a function of its linear disposition;
two state band regulator valve means arranged in combination with the 12 shift valve means for controlling the distribution of operating fluid through said conduit structure;
two state clutch regulator valve means arranged in combination with the 2-3 shift valve means for controlling the distribution of operating fluid through said conduit structure;
at least one variable pressure solenoid whose variable pressure fluid output is delivered to both regulator valve means, the variable pressure output of said solenoid being controlled by a program which profiles the output of said solenoid between a maximum output level and a lower output level; and
electronic control means for converting input signals thereto relating to operating conditions of said transmission into output signals by software means, said electronic control means output signals controlling the state of both of said regulator valve means such that said band and clutch means operate under the programmable profiled output of said variable pressure solenoid during a shift change and then allows full line pressure or the maximum output level of the variable pressure solenoid to be delivered to the respective means for controlling the relative motion of the elements of said gearing after a gear change has been effected.

33. The control system according to claim 32 wherein said source of operating fluid includes a pump driven by said input shaft.

34. The control system according to claim 32 wherein said 12 shift valve means includes a linearly shiftable member whose position is influenced by fluid forces acting thereagainst.

35. The control system of claim 34 wherein said shift valve means further includes actuator means for delivering a fluid output providing a fluid force against said member in response to an output signal from said electronic control means.

36. The control sytsem according to claim 32 wherein said 2-3 shift valve means includes a linearly shiftable member whose position is influenced by fluid forces acting thereagainst.

37. The control system of claim 36 wherein said 2-3 shift valve further includes actuator means for delivering a fluid output providing a fluid force against said member in response to an output signal from said electronic control means.

38. The control system of claim 32 wherein said two state band regulator means includes a linearly shiftable member whose position is influenced by the fluid forces acting thereagainst.

39. The control system of claim 38 wherein actuator means arranged in combination with regulator means for applying a fluid force against said member in response to an output signal from said electronic control means.

40. The control system according to claim 32 wherein said two state clutch regulator means includes a linearly shiftable member whose position is influenced by the fluid forces acting thereagainst.

41. The control system of claim 40 wherein an actuator is arranged in combination with said regulator means for applying a fluid force against said member in response to an output signal from said electronic control means.

42. The control system according to claim 32 wherein said electronic control means includes a micro-computer processed with the programmable ramping function for said variable pressure solenoid, said ramping function including the step of:
 (a) setting a predetermined initial output pressure for said variable pressure solenoid based on current engine torque;
 (b) establishing a shifttime over which a gear change is to be effected;
 (c) determining the time expired since shift initiation signal has been delivered from the electronic control means;
 (d) establishing a goal which is to be achieved by the variable pressure solenoid over the shifttime;
 (e) determining whither the shifttime involved with the respective shift has expired;
 (f) if NO at (e), stepwise incrementing the output pressure of the variable pressure solenoid;
 (g) determining whither the shifttime involved with the respective shift has expired; and
 (h) if NO at (g), repeat steps (f) and (g).

43. The control system according to claim 42 wherein the goal set in step (d) is accomplished by profiling the output pressure of said variable pressure solenoid over two separate periods.

44. The control system of claim 43 wherein said two periods are individually programmable timewise.

45. The control system according to claim 32 further including valve means disposed in said conduit structure for inhibiting operation of said lock-up clutch in other than selectable gear ratios.

46. The control system according to claim 32 further including operative means arranged in combination with said variable pressure solenoid for dampening the fluid output from said variable pressure solenoid.

47. The control system according to claim 46 wherein said operative dampening means is arranged proximate the output of said variable pressure solenoid.

48. The control system according to claim 32 wherein said electronic control means is configured to determine as a function of vehicle speed whether said band means or said second clutch means is operated to effect a down shift gear ratio change between third and second gear ratios.

* * * * *

UNITED STATES PATENT AND TRADEMARK OFFICE
CERTIFICATE OF CORRECTION

PATENT NO. : 4,838,126

DATED : June 13, 1989

INVENTOR(S) : Erich L. Wilfinger; Ronald J. Polomski; Darren L. Firth

It is certified that error appears in the above-identified patent and that said Letters Patent is hereby corrected as shown below:

Column 1, Line 17, "crankshift" should be --crankshaft--.

Column 6, Line 23, "8" should be --89--;
  Line 43, insert "one" after "actuating".

Column 7, Line 42, the fraction "$\frac{1}{2}$" should be --1/2--;
  Same Line, the fraction "$\frac{2}{3}$" should be --2/3--;
  Line 43, the fraction "$\frac{3}{4}$" should be --3/4--;
  Line 61, "line" should be "Line".

Column 9, Line 30, the fraction "$\frac{1}{2}$" should be ---1/2--;
  Line 55, the fraction "$\frac{2}{3}$" should be --2/3--;
  Same line, the fraction "$\frac{3}{4}$" should be --3/4--;

Column 10, Line 9, the fraction "$\frac{3}{4}$" should be --3/4--;
  Line 8, the fraction "$\frac{1}{2}$" should be --1/2--;
  Line 38, the fraction "$\frac{1}{2}$" should be --1/2--;
  Line 59, "188" should be --118--.

Column 11, Line 17, "series 307" should be --series of ports--.

Column 12, Line 64, "11" should be --110--.

Column 13, Line 3, "actuatr" should be --actuator--;
  Line 17, the fraction "$\frac{1}{2}$" should be --1/2--;

UNITED STATES PATENT AND TRADEMARK OFFICE
CERTIFICATE OF CORRECTION

PATENT NO. : 4,838,126

DATED : June 13, 1989

INVENTOR(S) : Erich L. Wilfinger; Ronald J. Polomski; Darren L. Firth

It is certified that error appears in the above-identified patent and that said Letters Patent is hereby corrected as shown below:

Column 14, line 36, "Rod" should be "Road".

Column 15, line 51, "40" should be --470--.

Column 17, line 22, "170" should be --1700--.

Column 19, line 43, "isi" should be --82--;
line 60, "32" should be --372--.

Column 20, line 51, the fraction "½" should be --1/2--.

Column 22, lines 5, 8, 21 and 55, the fraction "½" should be --1/2--;
lines 51, 54, and 66, the fraction "$\frac{3}{4}$" should be --3/4--;
line 67, the fraction "$\frac{2}{3}$" should be --2/3--.

Column 23, lines 12, 15, 54 and 57, the fraction "½" should be --1/2--;
lines 32, 67, the fraction "$\frac{2}{3}$" should be --2/3--.

Column 25, lines 54, 57 and 68, the fraction "$\frac{2}{3}$" should be --2/3--.

Column 26, lines 8, 42 and 50, the fraction "$\frac{2}{3}$" should be --2/3--;
line 29, the fraction "$\frac{3}{4}$" should be --3/4--;

UNITED STATES PATENT AND TRADEMARK OFFICE
CERTIFICATE OF CORRECTION

PATENT NO. : 4,838,126
DATED : June 13, 1989
INVENTOR(S) : Erich L. Wilfinger; Ronald J. Polomski;
Darren L. Firth It is certified that error appears in the above-identified patent and that said Letters Patent is hereby corrected as shown below:

Column 26, Line 57, the fraction "$\frac{1}{2}$" should --1/2--;

Line 58, "12" should be --1-2--.

Column 27, Line 47, "382" should be --381--;
          Line 63, "stat" should be --state--.

Column 29, Lines 21, 27, 34 and 56, the fraction "$\frac{3}{4}$'" should be --3/4--;

Column 30, Line 30, "converter" should be --Converter--;
          Line 31, after "fluid" insert --in--.

Column 31, Line 62, the fractions "$\frac{3}{4}$ and $\frac{2}{3}$" should be --3/4 and 2/3--.

Column 32, Lines 6, 32 and 34, the fraction "$\frac{2}{3}$" should be --2/3--;

Lines 18 and 31, the fraction "$\frac{3}{4}$" should be --3/4--;

Line 56, the fractions "$\frac{3}{4}$ and $\frac{2}{3}$" should be --3/4 and 2/3--.

Column 33, Line 21, the fraction "$\frac{3}{4}$" should be --3/4--;

Line 22 and 28, the fraction "$\frac{1}{2}$" should be --1/2--.

Column 37, Line 58, after "between" insert --said shafts, a lock-up clutch for operably connecting--.

UNITED STATES PATENT AND TRADEMARK OFFICE
CERTIFICATE OF CORRECTION

PATENT NO. : 4,838,126

DATED : June 13, 1989

INVENTOR(S) : Erich L. Wilfinger; Ronald J. Polomski; Darren L. Firth

It is certified that error appears in the above-identified patent and that said Letters Patent is hereby corrected as shown below:

Column 38, Lines 7, 14 and 45, "12" should be --1-2--.

Signed and Sealed this

Nineteenth Day of May, 1992

Attest:

DOUGLAS B. COMER

Attesting Officer

Acting Commissioner of Patents and Trademarks